United States Patent
Comardo

[19]

[11] Patent Number: 6,132,157
[45] Date of Patent: *Oct. 17, 2000

[54] CATALYTIC REACTOR CHARGING SYSTEM AND METHOD FOR OPERATION THEREOF

[76] Inventor: Mathis P. Comardo, 5301 Nolda, Houston, Tex. 77007

[*] Notice: This patent issued on a continued prosecution application filed under 37 CFR 1.53(d), and is subject to the twenty year patent term provisions of 35 U.S.C. 154(a)(2).

[21] Appl. No.: 08/989,863

[22] Filed: Dec. 12, 1997

Related U.S. Application Data

[62] Division of application No. 08/723,892, Oct. 1, 1996, Pat. No. 5,897,282.

[51] Int. Cl.⁷ .................................................. C10B 31/00
[52] U.S. Cl. .......................... 414/160; 414/586; 414/588; 414/804; 414/806; 414/345; 141/232; 222/608
[58] Field of Search ..................................... 414/800, 675, 414/804, 806, 146, 147, 808, 152, 156, 160, 162, 163, 167, 172, 183, 188, 587, 588, 586, 345, 199, 340, 342, 343, 397, 519, 520, 414, 749; 22/481, 482, 526, 537, 185.1, 478, 181.1, 608, 610; 141/373, 311 R, 325, 280, 283, 234, 232; 422/219

[56] References Cited

U.S. PATENT DOCUMENTS

| | | | |
|---|---|---|---|
| 2,457,220 | 12/1948 | Fowler et al. | 414/675 X |
| 2,483,207 | 9/1949 | Joseph | 414/675 X |
| 4,181,578 | 1/1980 | Stauffer et al. | 414/587 X |
| 4,205,939 | 6/1980 | Reyes | 414/749 X |
| 4,402,643 | 9/1983 | Lytton et al. | 414/160 |
| 4,521,150 | 6/1985 | Pigeon et al. | 414/749 |
| 4,585,203 | 4/1986 | Monne et al. | 414/749 X |
| 4,819,702 | 4/1989 | Gerlach | 141/232 |

FOREIGN PATENT DOCUMENTS

| | | | |
|---|---|---|---|
| 234053 | 2/1926 | United Kingdom | 414/160 |

*Primary Examiner*—Frank E. Werner
*Attorney, Agent, or Firm*—James L. Jackson; Mayor, Day, Caldwell & Keeton LLP

[57] ABSTRACT

A catalyst loading system for utilizing catalyst from a bulk supply located adjacent but not on the upper tube sheet of a catalytic reactor and for mechanized measuring of multiple identical quantities of catalyst and for mechanized loading of catalyst pellets into the reaction tubes of the reactor to achieve even drop rate, compaction and outage of the reaction tubes. A pair of electronic vibrators are mounted to the cart framework and provide for support and vibratory movement of a vibratory tray having a catalyst feed hopper adapted to feed catalyst pellets to a plurality of generally parallel catalyst transfer troughs along which catalyst pellets are moved by vibration of the vibratory tray to a plurality of drop tubes. A compartmented hopper is fixed to the vibratory tray and controllably feeds catalyst pellets into respective catalyst transfer troughs. A plurality of charging tubes are connected to respective drop tubes by a plurality of elongate flexible tubes and are maintained in fixed, spaced relation by a structural element so as to define a charging manifold for simultaneous, timed delivery of catalyst pellets into a plurality of reactor tubes. The charging manifold which can be raised and lowered has locator pins which are inserted into selected reactor tubes for orienting the charging tubes of the charging manifold with respect to a selected group of reaction tubes. An electronic control system controls the vibrators responsive to catalyst weight to achieve even catalyst drop rate during an entire catalyst charging cycle.

15 Claims, 11 Drawing Sheets

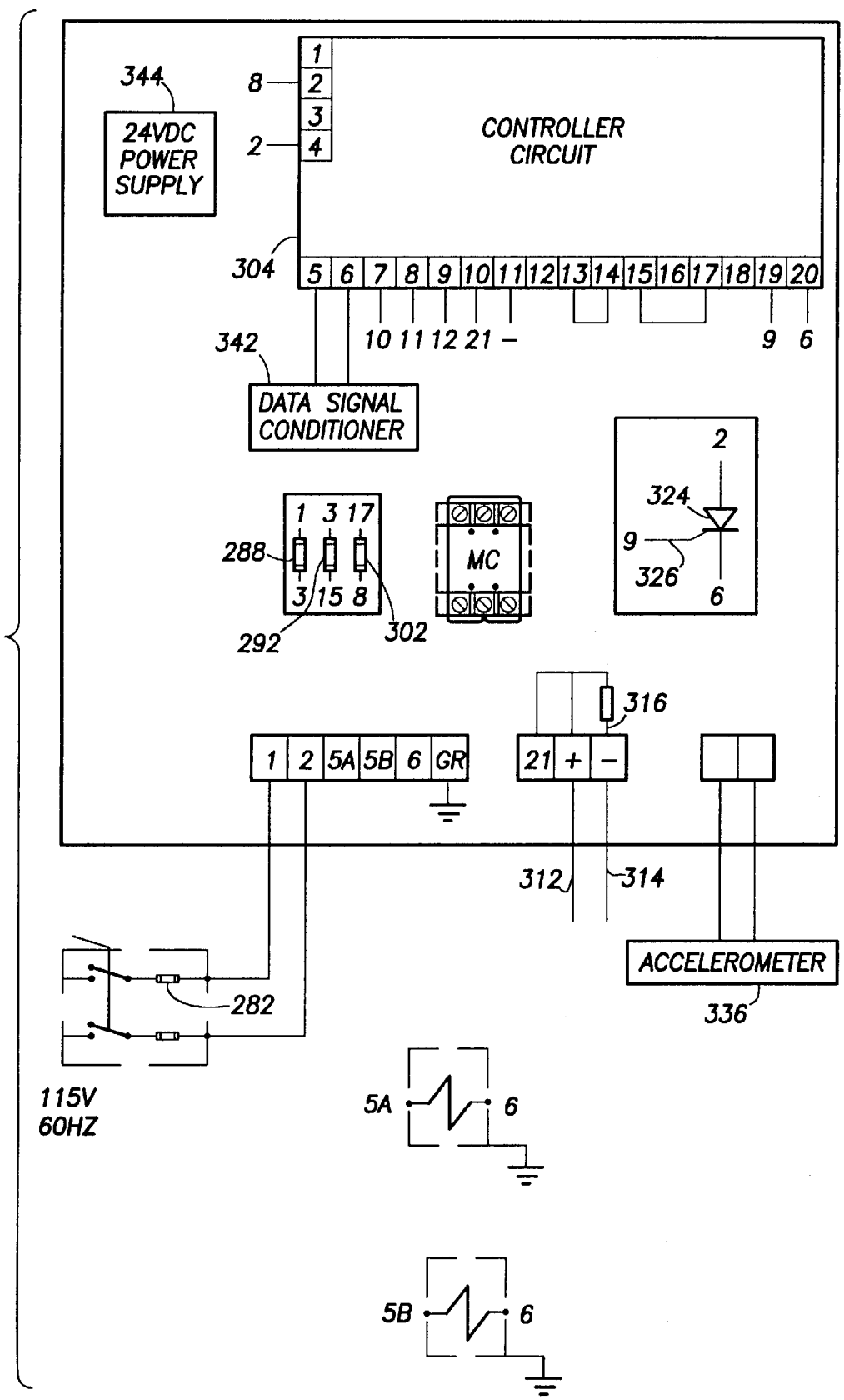

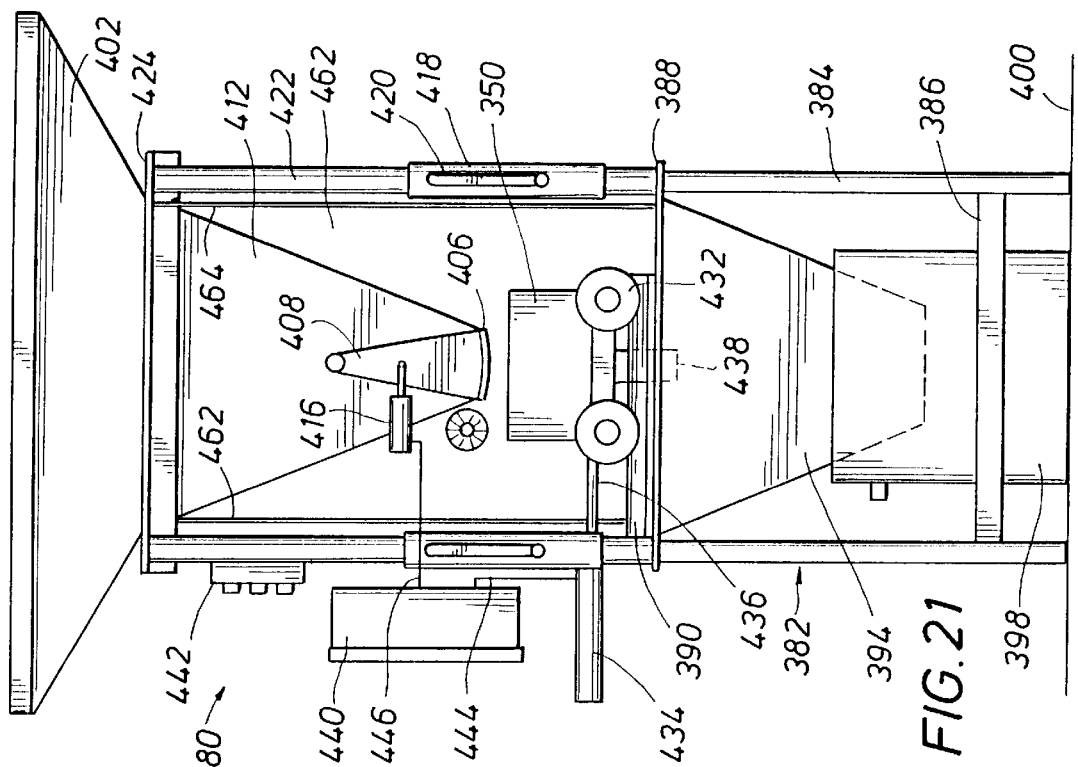
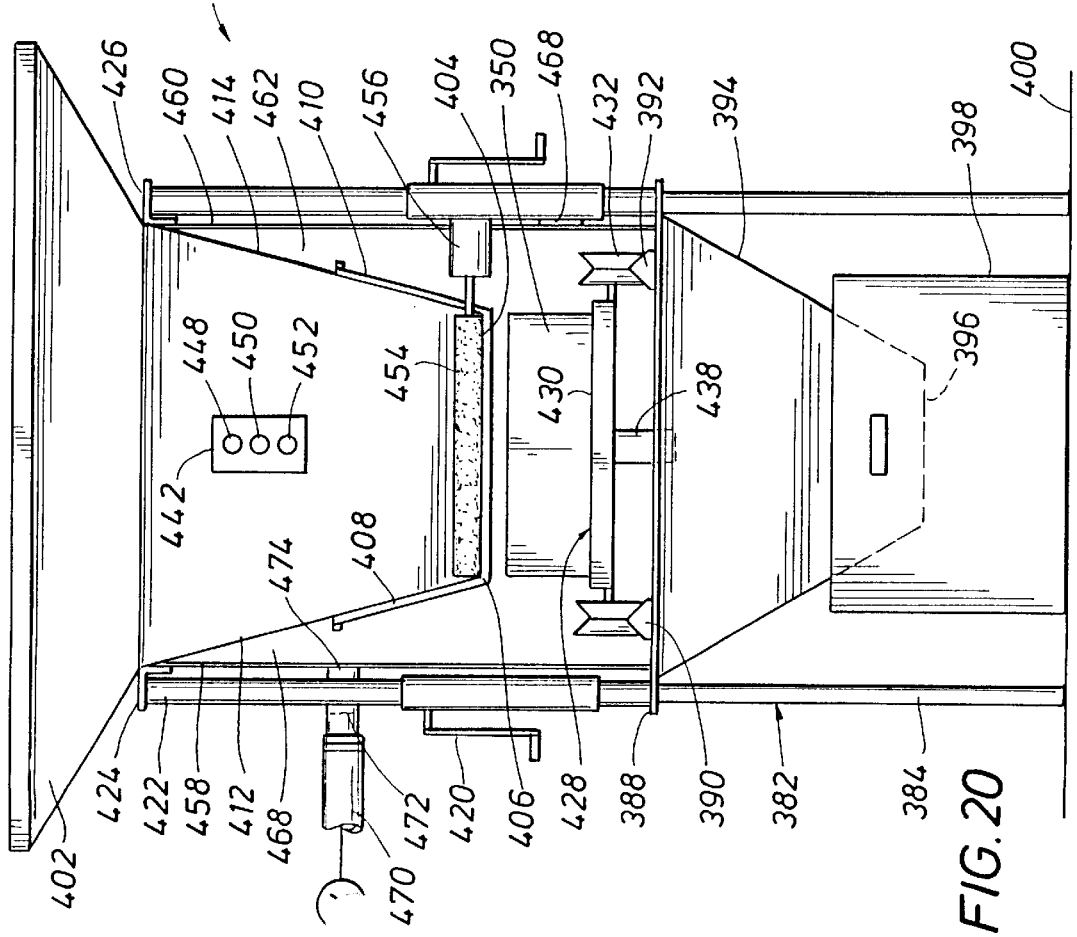

CATALYTIC REACTOR CHARGING SYSTEM AND METHOD FOR OPERATION THEREOF

This application is a divisional of application Ser. No. 08/723,892, filed Oct. 1, 1996, now U.S. Pat. No. 5,897,282.

BACKGROUND OF THE INVENTION

1. Field of the Invention

This invention relates generally to the controlled filling of the catalyst tubes of catalytic reactors with catalyst materials when the reactors are placed into service or when they have been cleaned of spent catalyst materials in preparation for further use in processes requiring catalytic reaction of flowing products of the process. More particularly, the present invention concerns a mechanized catalytic reactor charging system including a loading cart that is used by reactor servicing personnel and which is effective for efficient and controlled and simultaneous charging of a plurality of the reaction tubes of a catalytic reactor so that each of the plurality of reaction tubes will contain a precise measured quantity of the catalyst arranged in one or more layers and having a predetermined degree of compaction. Even further, the present invention concerns a mechanized catalyst loading cart having the capability for automatically adjusting the amplitude of vibratory movement of a dispensing control tray thereof with respect to the weight of catalyst material contained therein for dispensing, so as to ensure the consistent measured and timed dispensing of the catalyst material during a complete dispensing cycle of the loading cart. This invention also concerns a method and apparatus for the mechanized filling of catalyst charging hoppers at a location remote from the tube sheet of the reactor and for efficiently and safely charging the catalyst loading cart with catalyst material from the catalyst charging hoppers.

2. Description of the Prior Art

Although, for the purpose of discussing the preferred embodiment of the invention disclosed herein, the present invention is discussed particularly as it relates to the dispensing of measured quantities of catalyst material into the reaction tubes of catalytic reactors, it should be borne in mind that the invention may be employed for the dispensing of measured quantities of other materials for other purposes. Thus the scope of the present invention is not intended to be limited by the specific discussion of the preferred embodiment, but rather the preferred embodiment of this invention is intended only as a representative example that comes within the spirit and scope of the invention.

In a chemical plant the desired chemical is generally manufactured with the use of a tube and shell type catalytic reactor. The typical catalytic reactor is a cylindrical structure approximately 15' in diameter and can be 100' or so in height (all catalytic reactors are custom designed and built for a particular chemical process and thus can have a wide range of diameters and heights). The reactor is typically in the form of a cylindrical shell having domed and flanged top and bottom ends that are unbolted and removed to permit servicing of the reactor. A multiplicity of reaction tubes are typically located vertically in the reactor and have upper and lower ends that are welded to upper and lower tube sheets that extend transversely of the reactor shell and are located adjacent the end flanges of the reactor shell. The reaction tubes are typically in the order of 1" in diameter and are welded to the tube sheets in a geometric pattern. A worker standing on the upper tube sheet will visualize a flat sheet having a multiplicity of holes arranged in a geometric pattern and being about ½" apart, with each hole having a weld bead about it for connection of the upper tube end to the upper tube sheet.

One or more types of catalyst material is loaded into each of the reaction tubes and is provided in the form of small spheres or cylinders in the range of from ¹⁄₁₆" to ½" in diameter. The catalyst pellets are typically composed of ceramic or alumina material that is coated with a reactive agent for the process that is intended. Upon activation in the presence of a fluid flowing through the reaction tubes the catalyst reacts with the flowing fluid to give off a derivative product. Generally, the catalyst is loaded into the reaction tubes (some up to 20,000 tubes) in zones or layers. That is to Sty, if the reaction tube is 60' in height, catalyst "A" would comprise a 20' zone, catalyst "B" would comprise a second 20' zone and catalyst "C" would comprise a third 20' zone. The loading rate of the catalyst into these tubes determines the compaction of the catalyst within the tubes. This is referred to as "drop time". The space remaining within the tubes which is above the upper end of the catalyst is referred to as "tube outage". Ideally, if all (20,000) tubes have the same "drop time" during charging or loading thereof, the tube outage (the balance of unfilled tube) will be uniform. When the reactor tubes are all charged uniformly it will yield the best reactor performance, i.e., the best quality and quantity of resulting chemical product. At the present time most catalyst loading or charging operations are conducted by completely manual activities, with workers using a funnel to direct catalyst pellets into a selected reaction tube as the catalyst is poured by hand from small premeasured bags. It is well known that each worker of a charging crew will typically pour catalyst pellets at a slightly different rate so that the result can often be poor drop time uniformity thus resulting in uneven tube outages. In some cases the catalyst pellets will bridge within some of the reaction tubes due to non-uniform drop time and catalyst compaction, thus resulting in voids that cause "hot spots" and uneven fluid pressures and temperatures within the various tubes of the reactor. The resulting chemical product from reactors that have not been uniformly charged with catalyst is often less than optimum quality.

Various attempts have been made to provide a mechanized catalyst loader and method of filling catalytic reactor tubes with pellets of catalyst materials. One example is presented by U.S. Pat. No. 3,223,490 of Sacken, et al wherein a plate is drilled to the same pattern as the holes of the reactor tubes and corresponding fill tubes are dependent from the plate so as to be loosely received within respective reactor tubes. The catalyst material is then dropped through the fill tubes into the reactor tubes until the level of the catalyst in each of the reactor tubes reaches the level of the fill tubes. Thereafter, the plate and its fill tubes are lifted so that the remaining catalyst pellets in each of the fill tubes will be deposited into the reaction tubes. This type of controlled filling achieves virtually the same catalyst bed height in each of the reactor tubes but it does not take into consideration the problem of catalyst pellet bridging and compaction respective reaction tubes. Thus, though the upper end of the catalyst beds in the tubes can be virtually the same, voids within part of the reaction tubes which occurs by uncontrolled drop rate will result in uneven catalyst materials in the catalyst beds. Further, this method does not provide for consistent drop rate of the catalyst so that uneven tube outage and non-uniform compaction can be the result. This could result in the development of hot spots within the reactor which could be detrimental to reactor operation. Also, since virtually every reactor is "custom designed" so its height, diameter and number of catalyst reactor tubes can vary, clearly the catalyst loader shown in this patent must also be "custom designed", for the reactor hole pattern and dimension of the reactor. Thus, a catalyst loader of this nature would need to be dedicated to this particular reactor so that a catalyst loader would be needed for each reactor. It is desirable therefore to provide for catalyst loading operations by means of mechanized catalyst loading which is readily adjustable to the hole pattern and tube dimension of various types of catalytic reactors.

A catalyst loading cart mechanism is presented by U.S. Pat. No. 4,402,643 of Lytton, et al which has a plurality of catalyst storage hoppers each feeding a respective slot of a vibratory tray, with the catalyst pellets dropping from the tray into respective flexible conduits that are engaged within the upper openings of a plurality of reaction tubes. This apparatus has proved ineffective because the vibratory activity of the tray does not ensure precision control of the drop rate of the catalyst pellets from each of the feed grooves of the tray. Use of this apparatus has been discontinued as ineffective for simultaneous loading of multiple catalytic reactor tubes.

Another prior art reactor tube loading device is disclosed by U.S. Pat. No. 4,701,101 of Sapoff, wherein a catalyst loading funnel is provided having a plurality of generally triangular storage chambers which feed catalyst fill tubes that are inserted into the openings of a plurality of reaction tubes. The funnel mechanism may be supported by a wheeled cart and provided with flexible tubes having tubular spouts at the lower ends thereof which are received within the openings of a plurality of reaction tubes. The drop rate of the catalyst material is intended to be adjustable by adjusting the speed of rotation of metering rods or by raising and lowering metering rods in each funnel module to increase or decrease the speed of catalyst drop.

Although catalytic reactors for chemical processes may take various forms, for purposes of the present invention the reactors of particular concern are fixed bed type catalytic reactors having an external housing or shell of considerable height within which is mounted a multiplicity of reaction tubes, the tubes being supported at the upper and lower ends thereof by means of tube sheets. The reaction tubes may also be provided with intermediate support if appropriate for the structural integrity of the reactor mechanism. The catalytic reactors typically utilized in the petroleum and petrochemical industries typically employ reactor tubes having an internal diameter in the order of one inch and a length in the order of from 60' to 100' or more. Depending upon the character of the reaction to occur, the reactor tubes may be filled to a predetermined level with pellets of catalyst material so that the outage (the space above each tube bed of catalyst) will be substantially the same. In many cases, each reactor tube will contain two or more catalyst materials each arranged to a predetermined fill level. For efficient operation of catalytic reactors, each of the reaction tubes should be loaded with catalyst pellets in precisely the same way so as to obtain consistency of catalyst arrangement and compaction within each of the reaction tubes. Typically, catalytic reactors are loaded or charged by means of a highly labor intensive manual loading operation. In this case, workers are present at the upper tube plate of the reactor, where the openings of the multiple reaction tubes are exposed. These workers utilize funnels having lower discharge tubes that are inserted into the tube opening of a reaction tube to be filled. These tube filling personnel are typically trained to deposit reactor pellets into the funnel and thus, into the reaction tube in accordance with a predetermined quantity input which is referred to as "drop time" or "drop rate". If the quantity input of the catalyst is exceeded, it is possible that the catalyst pellets can bridge within the tubes, thereby developing voids in the catalyst beds of some of the tubes and thus resulting in uneven outage at the upper ends of some of the tubes. The character of catalyst input to the various tubes of a reactor is also determined by the character of the catalyst being loaded. Catalyst materials are provided in spherical pellets of various size and are also provided in cylindrical pellets of varying size. The respective pellets whether cylindrical or spherical must be dropped into the tubes in accordance with a particular timing sequence "drop time" so that the resulting catalyst bed in each of the tubes will be virtually the same and the outage at the tops of the tubes will also be virtually the same.

The upper and lower ends of a cylindrical reactor shell are typically closed by means of domed closures that are secured by bolts to upper and lower connector flanges of the reactor shell. For catalyst loading, the upper domed closure is typically unbolted from the catalyst shell, is lifted therefrom by means of a crane and is typically lowered to the ground until the tube filling procedure has been completed. To facilitate loading of the catalyst materials into the multiple reaction tubes of a catalytic reactor, a temporary "working compartment" of sufficient height for a worker to stand on the upper tube sheet of a reactor is assembled to the upper end of the reactor shell. This enclosure is typically air-conditioned for the comfort of workers and is provided with a dust removal system to ensure as much as possible that catalyst dust, that is typically liberated into the atmosphere during the charging operation, is continuously removed from the working enclosure. Further, the workers engaged in the loading operation typically wear sealed outer garments that prevent the catalyst dust from coming into contact with the worker's skin and also wear ventilation equipment to ensure the that the catalyst dust is not breathed by the workers.

Obviously, manual loading of catalyst materials by means of funnels as is currently done, is subject to many disadvantages. For example, the labor requirements for a manual catalyst loading operation add significant cost to the reactor and thus add to the cost of the resulting product. It is therefore desirable to provide for mechanized catalyst loading operations that significantly minimize labor costs. Since hand loading of catalyst materials is subject to wide variation of drop time, catalyst compaction, etc., depending upon the catalyst materials being used and the workers accomplishing the loading operation, it is desirable to provide a mechanized catalyst loading operation to enable precision loading of each of the catalyst tubes of the reactor so that the resulting catalyst bed in each of the tubes is virtually the same and the outage between the catalyst bed and the tube sheets of the reactor is also virtually the same. Tests which have been conducted indicate clearly that mechanized catalyst loading is much superior in comparison with hand loading of catalyst materials because the drop rate of the catalyst materials can be efficiently controlled so that the drop rate is the same with each of the catalyst materials within each of the reaction tubes.

From the inventor's studies concerning loading operations for catalytic reactors, virtually any phase of the catalyst handling and reactor loading operations where manual operations are used, the results of such operations can be improved by mechanization, thus achieving repeatability and better productivity. Thus, according to the present invention is desirable to provide a catalyst handling, measuring and catalytic reactor charging system that as much as possible takes advantage of mechanization and minimizes the manual aspects of catalytic reactor servicing operations.

SUMMARY OF THE INVENTION

It is a principal feature of the present invention to provide a novel mechanized catalyst handling, measuring and reactor tube charging system that permits efficiency and accuracy of catalyst measuring from a bulk catalyst supply located remote from the upper tube sheet of a catalytic reactor being charged and controlled dispensing of catalyst pellets into multiple reactor tubes in such manner that drop time, catalyst compaction and tube outage are consistent in all of the reactor tubes.

It is also a feature of the present invention to provide a novelized catalyst loading cart having the capability for use in the loading of catalyst material in catalytic reactors in virtually any size, design or tube pattern.

It is another feature of this invention to provide a novel catalyst loading cart having the capability of efficiently feeding catalyst pellets into the upper ends of the catalyst reaction tubes in accordance with a precision predetermined drop rate for insuring that the catalyst beds are virtually the same in each catalytic reactor tube and that no catalyst voids are present within any of the reaction tubes.

It is a even further feature of the present invention to provide a novel catalyst loading cart for catalytic reactors having multiple catalyst charging tubes that are provided with lower charging fittings, with the fittings being supported by a charging manifold structure and arranged for simultaneous insertion of the open upper ends of a plurality of reaction tubes so that multiple reaction tubes can be simultaneously charged with catalyst.

It is an even further feature of the this invention to provide a novel catalyst loading cart having a wheeled cart framework which can be raised relative to caster wheels which permit the cart to be movable on the tube sheet of the reactor and which can be lowered relative to the caster wheels to provide for stable support of the cart on the tube sheet of the reactor or on a cover panel that might be provided to cover appropriate portions of the tube sheet.

It is another feature of this invention to provide a novel catalyst loading cart mechanism having a mobile cart framework for support of a vibratory catalyst transfer tray, and wherein a charging manifold is provided that is vertically moveable relative to the cart framework to provide for controlled positioning of catalyst discharge openings of the manifold in charging registry with a selected group of the reaction tubes for simultaneous charging thereof with catalyst material.

It is an even further feature of this invention to provide a novel catalyst loading cart having a vibratory catalyst transfer tray with a plurality of catalyst transfer troughs or grooves through which catalyst material is conducted to a plurality of drop tubes and wherein a pair of electronically energized vibratory for the vibratory tray are each individually amplitude adjustable responsive to ensure uniformity of catalyst discharge from each of the slots of the tray so that the drop rate of catalyst into each of the plurality of reaction tubes being charged will be uniform.

It is another feature of the present invention to provide a mechanized catalyst loading cart having an adjustable feed hopper with multiple catalyst chambers, one for each catalyst transfer trough of a vibratory tray and wherein the amplitude of vibration of the tray is automatically adjustable responsive to the weight of catalyst within the hopper so that the rate of delivery of catalyst material to the drop tubes of the tray during a charging cycle will not change as the catalyst material is dispensed and the weight of the catalyst within the hopper decreases.

It is also a feature of the present invention to provide a mechanized catalyst loading cart having a multi-compartment catalyst hopper from which catalyst is fed at a uniform drop rate from each of the hopper compartments and further having at least one portable charging hopper which also has multiple compartments of identical size and which is filled with catalyst at a location remote from the upper tube sheet of a reactor and, after being closed to secure the catalyst contained therein, is carried to a catalyst loading cart, positioned on the upper tube sheet of the reactor and positioned in charging assembly with the hopper of the cart and is manipulated to discharge the measured contents of the compartments thereof into the respective compartments of the loading cart hopper without any risk of spillage.

Among the several features of the present invention is contemplated the provision of mechanized apparatus for efficiently, accurately and quickly filling all of the multiple compartments of a portable charging hopper with substantially identical quantities of catalyst, so that the hopper of the catalyst loading cart can itself be charged with accurately measured quantities of catalyst in the respective charging chambers of the apparatus and can do so quickly and efficiently and with minimal labor costs.

Briefly, the various objects and features of the present invention are realized through the provision of a mechanized catalyst loading cart of mobile nature which is used at the upper tube sheet of a catalytic reactor for the purpose of charging the multiple reaction tubes of the reactor with one or more types of catalyst pellets. In each embodiment of the present invention, the catalyst loading cart includes a vibratory tray having a plurality of tray troughs or grooves that conduct catalyst pellets from the tray into a plurality of flexible catalyst delivery tubes that direct the falling catalyst pellets into respective reaction tubes of the reactor. One delivery tube will be provided for each of the catalyst troughs or grooves of the tray. At their lower ends, the delivery tubes are fixed to a charging manifold having a plurality of depending charging tubes of sufficiently small dimension as to enter within the small diameter openings of the reaction tubes. The charging tubes are arranged according to the pattern and spacing of the reaction tubes to be charged. The charging manifold is provided with a pair of manifold locators that enter tube openings at the tube sheet and provide for orientation of the manifold and the plurality catalyst charging tubes so that the charging tubes will enter a selected group of reaction tubes for the purpose of catalyst charging. The vibratory tray is provided with a hopper having a plurality of catalyst compartments, one for each of the catalyst transfer troughs or slots of the tray. Catalyst material is metered from each of the catalyst compartments by means of an adjustable weir having a plurality of weir gates thereon which extend into respective transfer troughs and control delivery of catalyst pellets from the respective hopper compartments to the transfer troughs.

The vibratory tray is vibrated by means of two or more electrically energized vibrators that are each amplitude adjustable by means of electronic trimmer circuits. By adjusting individual potentiometers of the trimmer circuits, a user can achieve substantially even delivery of catalyst pellets from each of the plurality of catalyst troughs of the vibratory tray. This feature overcomes a disadvantage of the prior art, because a single vibrator cannot ordinarily be adjusted to provide even dispensing of catalyst pellets from each of the troughs of a vibratory tray.

For optimum delivery of catalyst pellets into a plurality of reaction tubes, a predetermined catalyst drop rate is established which is sufficiently high to achieve efficient production and is not high enough to result in bridging or improper compaction of catalyst pellets within respective reaction tubes. It has been determined, however that the feed rate of catalyst pellets from a vibratory tray having a multiple chamber hopper associated therewith will typically change during a catalyst charging cycle as the result of decreasing catalyst weight. The amplitude of vibration of a vibratory tray will typically change from the time dispensing begins, when the hopper compartments are full of catalyst pellets, to the time when the total charge of catalyst has been depleted. The vibratory tray will be vibrated at a desired amplitude when catalyst dispensing begins, but as the weight of the catalyst decreases within the hopper compartments, the vibratory amplitude of the tray will be increased simply because the weight of the dispensed catalyst is not present and thus the mass of the vibratory tray and its contents becomes less as the catalyst dispensing cycle progresses. It is desirable, therefore to provide for vibration of a catalyst transfer tray which is minimally influenced by changes in the weight or mass of the transfer tray and its contents. This feature is provided by an electronically controlled system which automatically adjusts the electrical power to the vibrators to compensate for reduced weight so that the rate of catalyst delivery from the hopper through the transfer tray will remain substantially the same as the catalyst pellet charge is depleted during dispensing. A solution of this problem is achieved by the provision of an accelerometer regulated amplitude control system which senses the amplitude of vibration of the vibratory tray and provides electronic signals responsive thereto. These weight related electronic signals are then conditioned and fed to vibrator control circuitry to automatically trim the electrical power supply to the vibrators as needed to maintain a substantially constant rate of tray vibration and thus maintain an substantially constant rate of catalyst pellet drop from the catalyst transfer troughs during a complete catalyst charging cycle. Thus, the delivery of catalyst pellets to the reactor tubes is not significantly altered by the decreasing weight of catalyst during a catalyst charging sequence.

Since catalyst materials have been determined to have carcinogenic characteristics requiring workers during catalyst loading operations to wear sealed clothing and ventilation systems, the vibratory tray is provided with a vacuum hood and a vacuum tray so that any catalyst dust or tailings liberated from the catalyst pellets will be removed by the vacuum for disposal. Thus the loading cart apparatus assists in maintaining the working environment for the catalyst loading operation substantially free of catalyst dust and tailings.

To ensure against inadvertent spillage of catalyst pellets onto the upper tube sheet and thus into the reaction tubes during charging of the loading cart hopper with catalyst and to further ensure simple and efficient charging of each of the loading cart hopper compartments with measured quantities of catalyst a portable charging hopper is provided. This charging hopper is provided with the same number of measuring compartments as the compartments of the loading cart hopper and is provided with a movable bottom wall gate for simultaneous dumping of the contents of its compartments into the respective compartments of the loading cart hopper. Each of the various catalyst compartments of the charging hopper is of virtually the same dimension, thus by simply pouring catalyst pellets into all of the compartments and wiping away the excess in precisely the same manner at each loading of the charging hopper, assurance is provided that each of the measuring compartments of the charging hopper contains virtually the same quantity of catalyst pellets. The charging hopper is filled at a catalyst source location that is remote from the upper tube sheet of the reactor and is carried manually to the loading cart and placed in assembly with the loading cart hopper. Its bottom wall gate is then moved to its open position for dumping the measured catalyst of each of the charging hopper compartments into respective compartments of the loading cart hopper. Further, by providing a charging hopper loading machine for mechanized loading of the charging hopper, virtually the same total volume of catalyst material can be discharged from the charging hopper into the dispensing hopper of the loading cart during each dispensing cycle. The charging hopper loading machine receives an empty charging hopper and, upon activation of its mechanism, the machine moves the empty charging hopper to a position for filling and opens a gate of its catalyst hopper and, while being vibrated, discharges a sufficient volume of catalyst pellets onto the upper portion of the charging hopper to overfill each of the measuring compartments thereof. As the machine then returns the overfilled charging hopper to the start position a leveling brush, which may be statically located or movable, i.e., rotatable, will remove the excess catalyst pellets, thus leaving the multiple measuring compartments of the charging hopper with a precisely volumetrically measured quantity of catalyst. The filled charging hopper is then closed and latched to ensure against spillage and is carried from the loading facility to the catalyst loading cart and assembled with the hopper of the cart. When the lower gate of the charging hopper is then opened the volumetrically measured catalyst of each of the charging hopper compartments will descend into respective dispensing compartments of the hopper of the cart. The net result, therefore, is the systematized, low cost, accurate charging of the multiple tubes of a catalytic reactor, thus providing optimum results from the reactor charging procedure and at the same time providing significant labor savings as compared to conventional manual reactor servicing operations.

BRIEF DESCRIPTION OF THE DRAWINGS

The various objects and advantages of this invention will become apparent to those skilled in the art upon an understanding of the following detailed description of the invention, read in light of the accompanying drawings which are made a part of this specification and in which:

FIGS. 16 and 17 are electrical layout illustrations showing features of the electronic control circuitry for the catalyst loading cart of this invention;

FIG. 20 is a front elevational view of an automated mechanism for accurately loading a catalyst charging hopper so that each of the multiple measuring compartments of the catalyst charging hopper will contain virtually identical volumes of catalyst pellets;

FIG. 21 is a side elevational view of the automated catalyst charging hopper loading mechanism of FIG. 20, with the dust shroud thereof removed to enable visualization of the operational components thereof.

DETAILED DESCRIPTION OF PREFERRED EMBODIMENT

Figure 1:
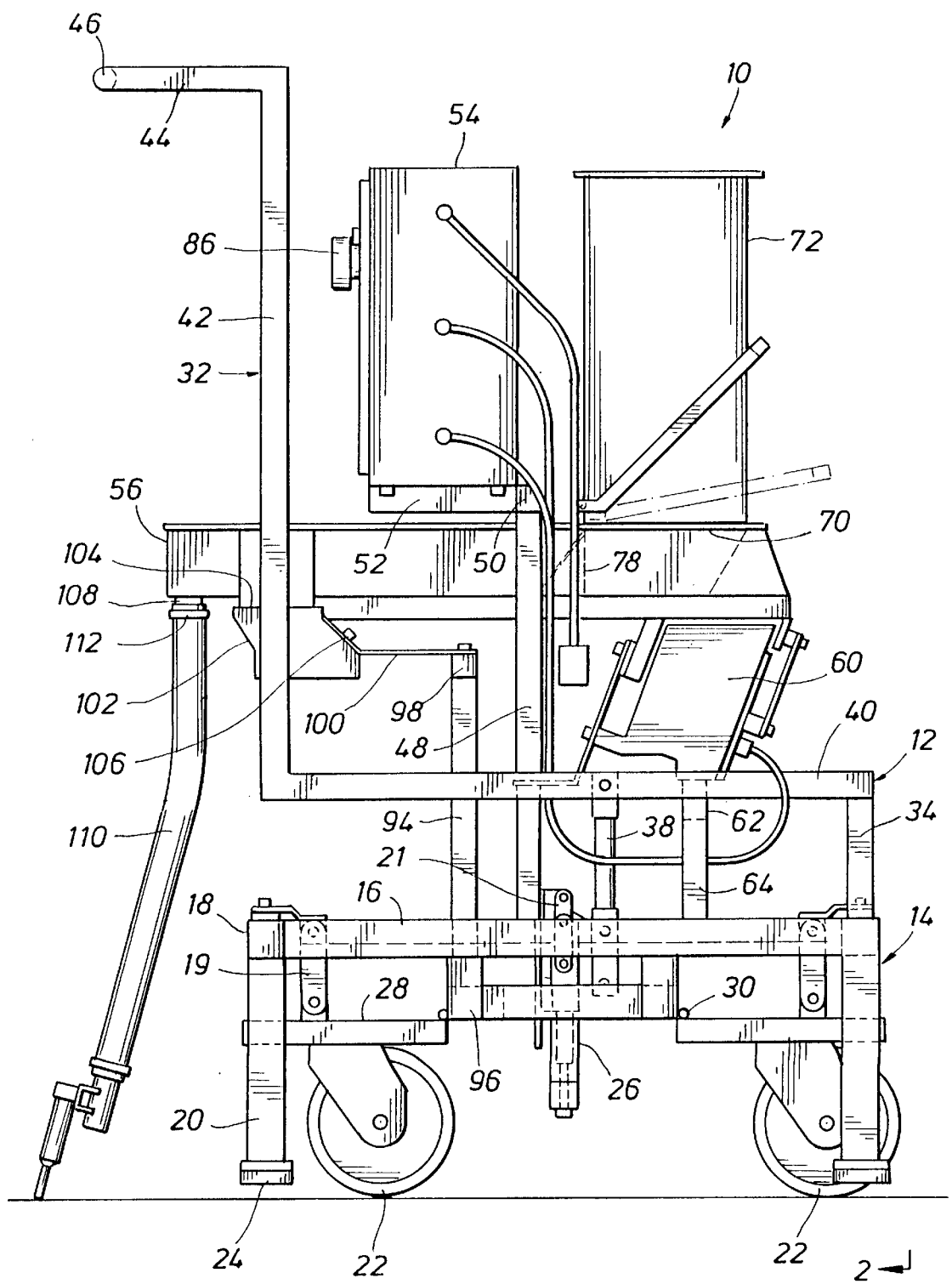
FIG. 1 is a side elevational view of a catalyst loading cart representing a preferred embodiment of the present invention.
Figure 2:
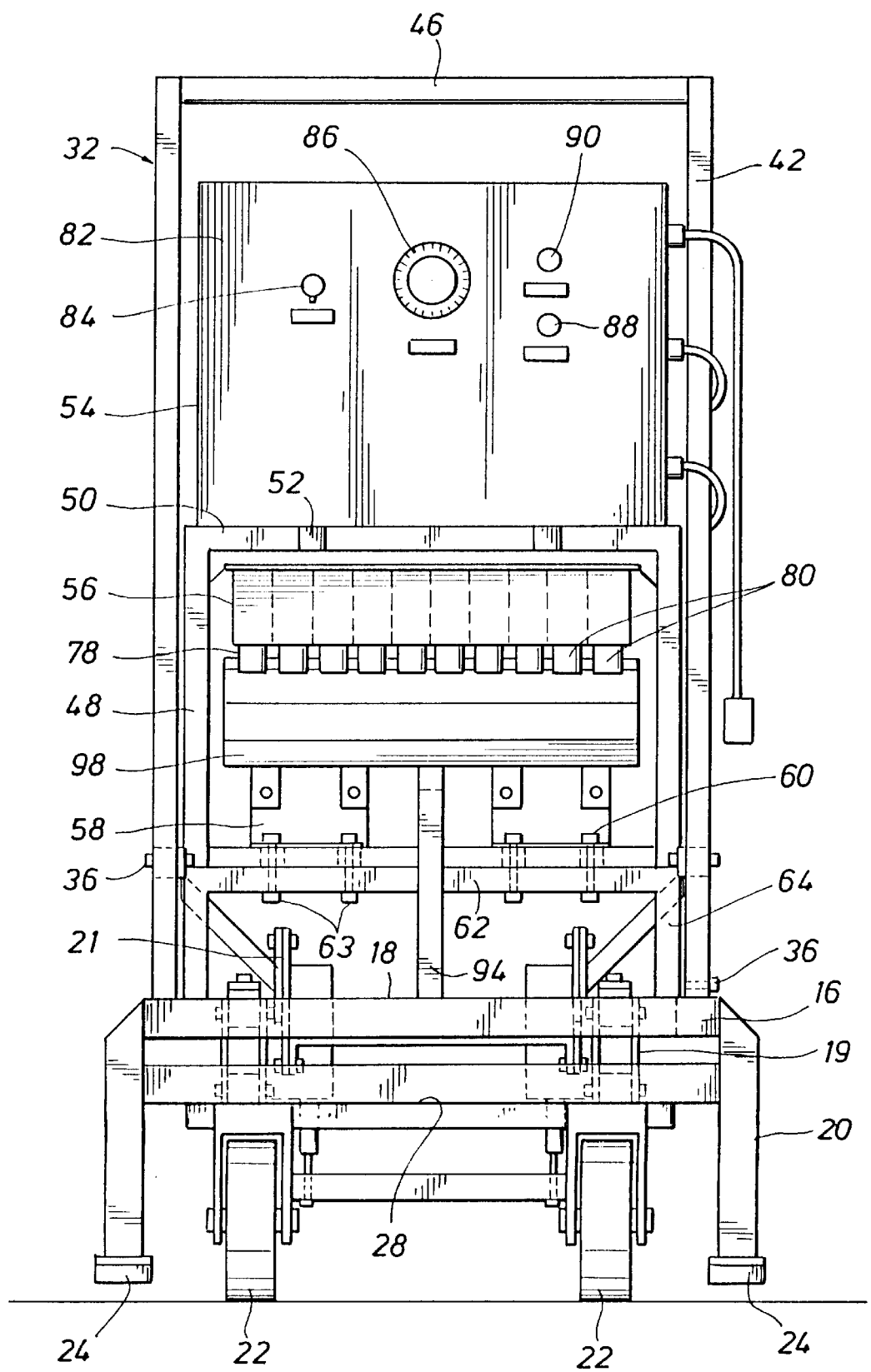
FIG. 2 is an end view of the catalyst loading cart taken along line 2—2 of FIG. 1.
Figure 3:
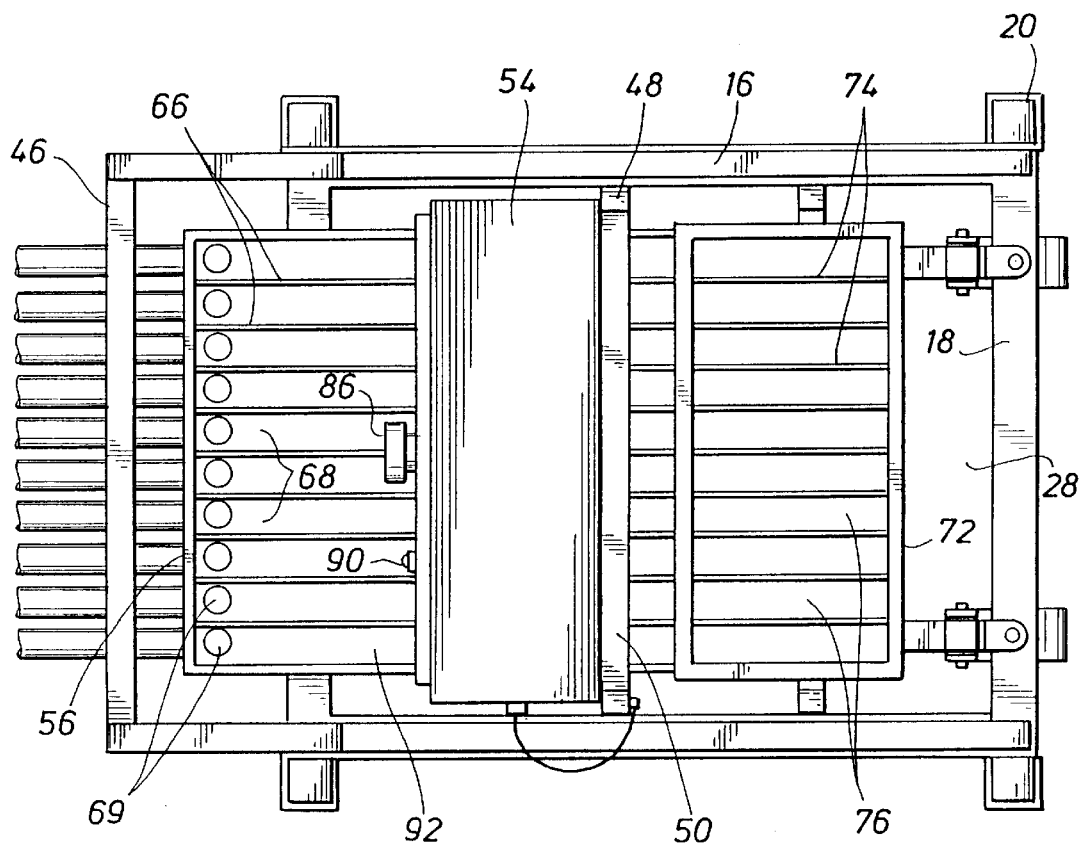
FIG. 3 is a plan view of the catalyst loading cart of FIGS. 1 and 2.
Figure 13:
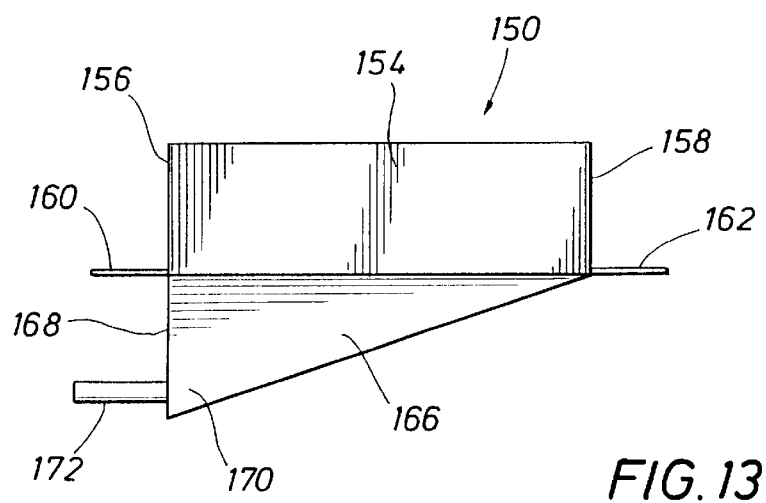
FIG. 13 is a side elevational view of the catalyst dust tray of FIGS. 9–12.

Referring now to the drawings and first to FIGS. 1–3, a mechanized catalyst loading cart that in constructed in accordance with the principles of the present invention is shown generally at 10 and incorporates a cart framework, shown generally at 12, having a wheeled base structure shown generally at 14. The wheeled base 14 is in the form of a rectangular framework base having side members 16 and end members 18 from which depend support legs 20 that are located at respective corners of the rectangular base. The wheeled base structure 14 is provided with a plurality of casters 22 which enable the cart to be rolled along any horizontal surface, such as the horizonal upper tube sheet of a catalytic reactor. To isolate the vibration of the loading cart mechanism from the upper tube sheet of the reactor, cushioned feet 24 are provided for each of the legs 20. These cushioned feet rest upon the upper tube sheet of the reactor after the cart has been properly located for dispensing of catalyst into particular reaction tubes.

It is desirable to provide the loading cart for ease of movement on the upper tube sheet of the reactor so that the charging manifold of the cart, to be discussed hereinbelow, can be easily positioned with respect to reactor tubes to be charged. This feature is accomplished by connecting the casters 22 to the wheeled base 14 by a retraction mechanism that retracts the casters to enable the cushioned feet 24 of the wheeled base 14 to rest on the upper tube sheet of the catalytic reactor. The cushioning activity of the cushioned feet 24 is provided by rubber mounts which are attached to the bottom of each leg and serve to isolate the vibration of the vibratory tray to the catalyst loading cart. Retraction of the casters 22 is accomplished by a linear motor 26 which may conveniently take the form of an air energized cylinder and piston assembly or an electrically energized linear motor or the like which operates through a mechanical linkage for accomplishing pivotal movement of retraction plates 28 about respective pivots 30 thus raising or lowering the casters which are mounted to the retraction plates. When the retraction plates 28 are pivoted upwardly about their respective pivots 30 in essence the wheeled base 14 is lowered, causing the cushioned feet 24 of the base to come into supporting contact with the upper tube sheet of the reactor. Thus, in the retracted positions of the castors, the wheeled base 14 will be substantially immoveable with respect to the upper tube sheet of the reactor and thus will not move inadvertently as catalyst material is being dispensed into specific reaction tubes.

The framework 12 of the catalyst loading cart is provided with an upper moveable frame section shown generally at 32 and incorporating a pair of frame connectors 34 that are connected to pivot members 36 to thus permit the frame structure 32 to be pivotally moveable relative to the wheeled base 14. This pivotal movement may be controlled by a linear actuator 38 having its ends connected respectively to horizontal members 40 of the frame 32 and to the rectangular frame 16 of the wheeled base. The frame 32 also incorporates upright members 42 that are interconnected with the horizontal members 40 as shown in FIG. 1 and are provided with lateral handle support members 44 to which a transverse handle 46 is connected. A worker using the wheeled mechanized catalyst loading cart of this invention will grasp the transverse handle 44 and will be able to manipulate the position of the cart relative to particular reaction tubes of the catalytic reactor. For feeding of pelletized catalyst material, it is desirable to contain the catalyst within a compartmentalized hopper and to feed the catalyst material by vibration from individual compartments of the hopper to individual troughs of a catalyst transfer tray and then to controllably drop the catalyst pellets from the tray into individual reaction tubes at a controlled drop rate that will ensure proper compaction of the catalyst within the reaction tubes without allowing the catalyst material to become bridged and to develop voids within the reaction tubes. Accordingly, the catalyst loading cart of this invention is provided with a pair of vibratory tray supports 48 having their lower ends connected to the wheeled base structure 14 and having a transverse member 50 interconnecting the upper ends thereof. A pair of lateral support members 52 have their ends connected to the transverse support member 50 and provide for support of an electrical control panel module 54 in the form of a generally rectangular enclosure to be discussed in detail hereinbelow.

A vibratory tray 56 is supported in generally horizontally oriented manner by means of a pair of electronic vibrator elements 58 and 60 that are each bolted or otherwise connected to a horizontal support structure 62 of the wheeled base 14. The horizontal support 62 is positioned by a pair of upright support members 64 which are fixed to the rectangular base framework of the wheeled base structure 14. The vibratory tray as shown in FIG. 1 is fixed to the upper portions of each of the vibrators 58 and 60 so that the tray is oscillated by the vibrators. The vibratory tray 56 is provided with a plurality of spaced parallel partitions 66, dividing the tray into a plurality of catalyst transfer troughs or grooves 68 shown in FIG. 3. The catalyst transfer troughs are arranged so that at one end they are located beneath the bottom outlet opening 70 of a multi-chamber hopper 72 which is mounted such as by welding to the upper portion of the catalyst transfer tray. As shown in FIG. 3, the hopper 72 is provided with a plurality of spaced parallel internal partitions 74 defining a plurality of internal catalyst chambers 76 which are arranged for discharge of catalyst pellets into respective ones of the plurality of troughs or grooves 68 of the catalyst transfer tray. Discharge of catalyst pellets into the transfer troughs of the tray is controlled in part by vibration of the hopper along with the tray by the electronic vibrators 58 and 60 and in part by an adjustable weir member 78 having a plurality of gate sections 80 each arranged within one of the catalyst transfer troughs. The weir member is adjusted upwardly or downwardly as desired relative to the catalyst transfer troughs so as to control the effective size of the discharge openings of the hopper compartments relative to the respective transfer troughs of the vibratory tray.

Figure 11:
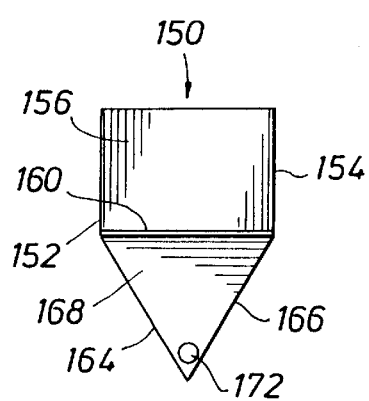
FIG. 11 is an end view of the catalyst dust pan of FIGS. 9 and 10.
Figure 12:
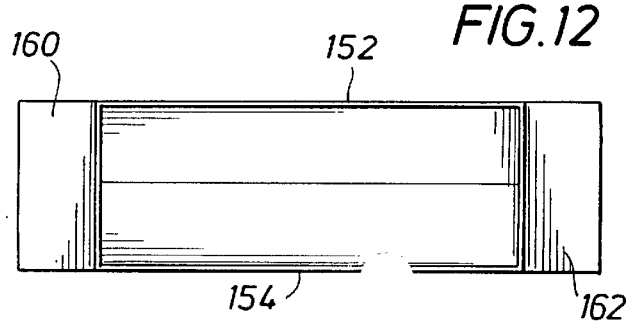
FIG. 12 is a plan view of the catalyst dust pan of FIGS. 9–11.

One of the problems that have been found with vibratory type feeder systems for catalyst pellets or any other small objects is that is very difficult to achieve substantially consistent vibratory feeding or transfer of objects so that the discharge from each of the troughs of a vibratory tray is essentially the same. In the case of delivery of catalyst materials, it is necessary that the catalyst pellet drop time in each of the various reaction tubes of a catalytic reactor be virtually the same. If catalyst pellets are feeding faster from one or more troughs of the tray, the result will be uneven catalyst drop rate and thus uneven compaction of catalyst within the reaction tubes being charged. In this case voids can occur in certain reactor tubes by bridging of the catalyst pellets, thus resulting in differing outage of the tubes when the loading operation has been completed. The pressure required to force fluid through the reaction tubes will not be the same for all tubes. Although vibrator apparatus may be adjustable in amplitude of vibration, it is virtually impossible to adjust the amplitude of a single vibrator device is such manner that all of the troughs of vibratory tray can achieve essentially the same catalyst drop rate. It has been determined that by providing two vibrator devices such as shown at 58 and 60, each being connected to the cross member support 62 by means of bolts 63 and by providing trimmer adjustments for each vibrator for synchronization thereof and a master vibrator adjustment for simultaneously adjusting the amplitude of both vibrators to thus accomplish precise adjustment of the drop rate of the catalyst pellets from all of the troughs of the vibratory tray so that the catalyst output of each of the transfer troughs is essentially the same. As shown particularly in FIGS. 1 and 2, the electronic panel housing 54 is provided with a control panel 82 having a power switch 84, a master potentiometer 86 for controlling electrical power input to both vibrators and trimmer potentiometers 88 and 90 for individual control of each of the vibrators 58 and 60. Thus, to control the discharge rate of each of the troughs of the vibrator tray so that the discharge rates of the multiple trays are essentially identical, the trimmer adjustments 88 and 90 may be individually manipulated. When each of the troughs is outputting substantially identical volumes of catalyst pellets through selectively controlled vibration of the vibrators 58 and 60, then the drop rate of the catalyst pellets from the multiple troughs of the tray may be increased or decreased simply by appropriate adjustment of the master potentiometer 86 which causes simultaneous amplitude adjustment of both of the vibrators while the previously adjusted trimming control is maintained. It is desirable that the catalyst pellets that are being loaded into the reaction tubes of the reactor be free of catalyst dust since the dust can interfere with fluid transition through the catalyst pellet mass and thus interfere with the optimum reaction that is designed. Catalyst pellets however are typically delivered in premeasured bags and the bags will typically contain a small quanity of catalyist dust and tailings that will typically be introduced into the hopper compartments along with the catalyist material. It is desirable to ensure that this dust be separated from the catalyist pellets before the pellets are dropped into the reactor tubes. Even further, catalyst materials are known to have a carcengenic characteristic; thus it is highly desirable to ensure that workers involved in catalyist loading operations are protected against contact with catalyst dust and tailings and that they be protected from breathing the catalyist dust. In one form of the invention, as shown in FIGS. 1–3, the catalyist dust or tailings are caused to drop from each of the catalyst troughs into a receptacle that receives and secures the catalyst tailings to prevent them from invertially entering the reactor tubes or becoming air entrained dust that contaminates the working environement about the catalyst loading operation. In another form the of the invention, as shown in FIG. 11, the loading cart is provided with a vaccum engerized dust or tailing removal system including an evacuated trough and an evacuated hood that cover at least a portion of the catalyst loading troughs and serve to forcefully remove the dust and tailings from the catalyist pellets so that they can be dropped substantially clean into the reactor tubes. In fact, the catalyst loading cart of FIGS. 1–3 if desired, may be provided with a vacuum controlled dust and tailing removal system instead of the gravity removal system that is shown.

As is evident from FIG. 3, the bottom surface that defines the bottom of each of the catalyist transfer troughs 68 defines a multiplicity of small openings 92 which cover only a small section of the length of each of the troughs. After the catalyst pellets and any dust or tailings that accompany the pellets have been deposited from the hopper compartments into the respective troughs, vibration of the tray will cause the catalyst and the dust and tailing contaminents through traverse along the tray until the openings 92 are reached. The dust and tailings will then fall through the multiple small openings 92 thus allowing the catalyst pellets to continue forward movement by the vibratory action of the tray to the respective discharge openings 69 of the catalyst transfer troughs.

As shown particularly in FIG. 1, a support post 94 projects upwardly from a central framework section 96 of the wheeled base 14. A transverse support member 98 has its intermediate portion connected to the upper end of the support post 94 as shown particularly in FIG. 2. A plurality of lateral support members 100 are bolted or otherwise connected to the lateral support 98 and in turn provide support for a receptacle 102 having its upwardly facing opening 104 arranged to receive the dust and tailings that fall through the openings 92 of the vibratory catalyst tray. The receptacle 102 is arranged so that is does not phyiscally touch the structure of the vibratory tray and thus does not vibrate along with the tray. Any dust and catalyst tailings that fall into the receptacle 102 will simply be contained until the receptacle has become sufficiently full that it should be emptied. The receptacle 102 is provided with a releasable connector 106 so that the tray can be released from the supports 100 simply by loosening the connector.

Figure 4:
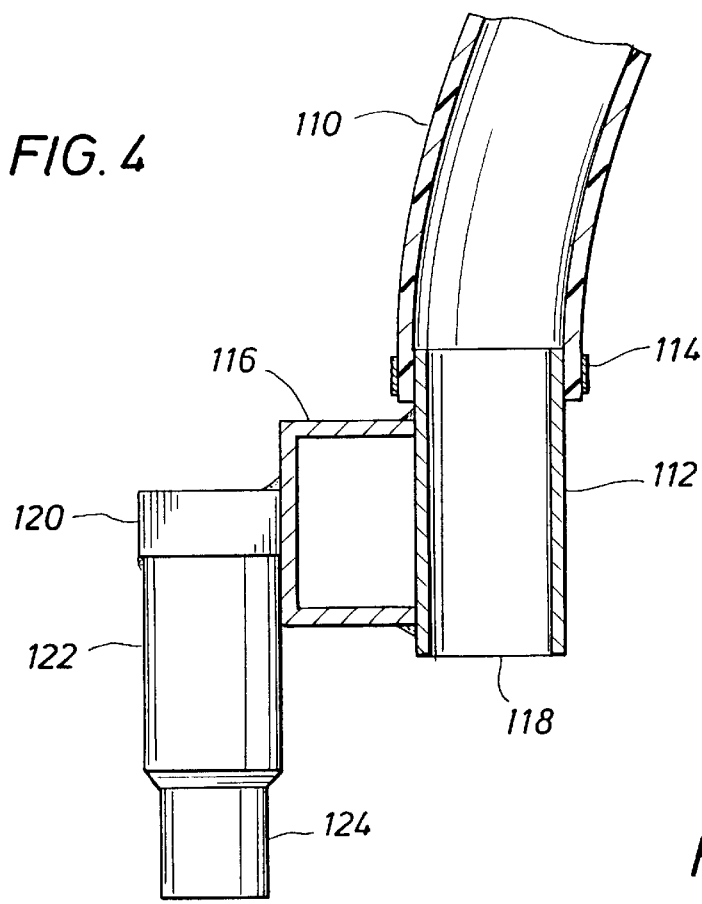
FIG. 4 is a partial sectional view of the catalyst charging manifold of the apparatus shown in FIGS. 1—3.
Figure 5:
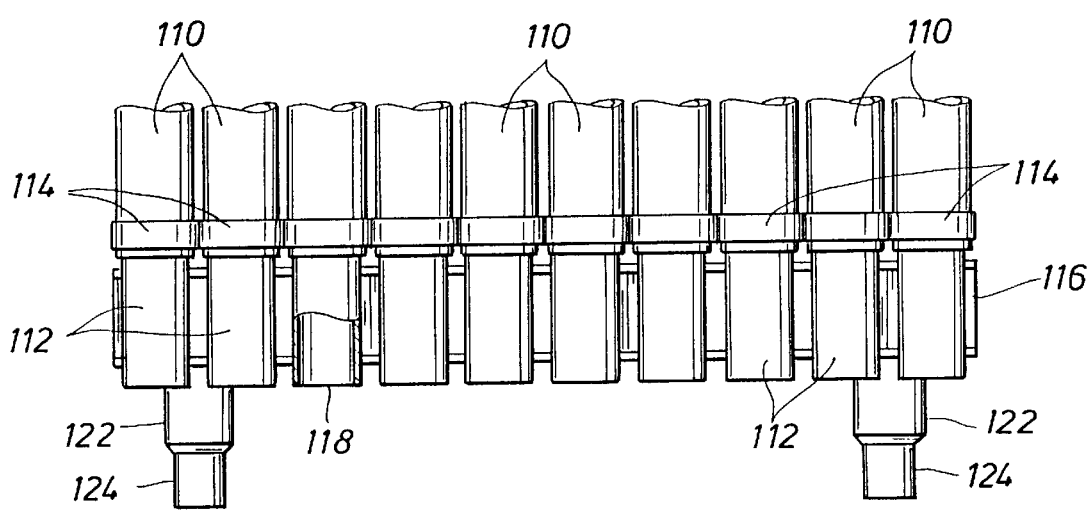
FIG. 5 is an elevational view of the charging manifold of FIG. 4.
Figure 6:
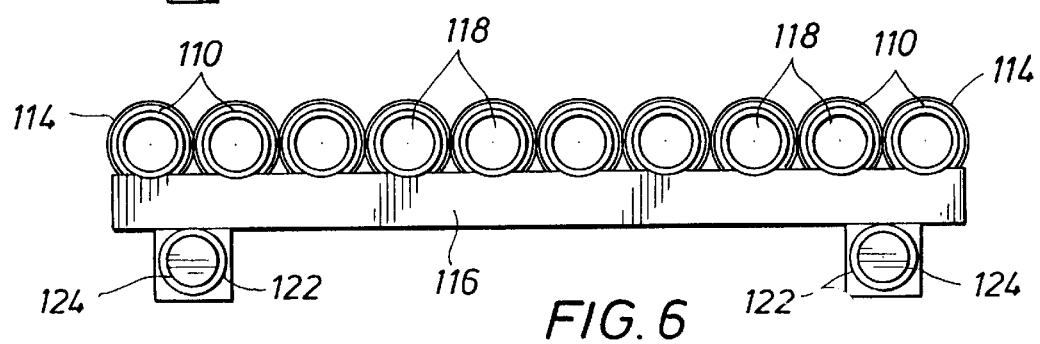
FIG. 6 is a plan view of the charging manifold of FIGS. 4 and 5.
Figure 7:
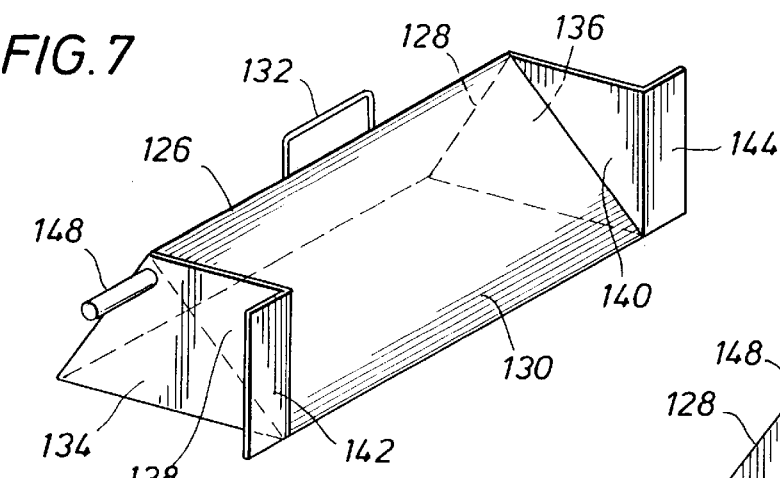
FIG. 7 is an isometric illustration of a vacuum type vent hood that is mounted above the catalyst transfer tray and which serves to remove catalyst dust that might be present in the tray.

At the end of the vibratory tray, opposite the electronic vibrator apparatus, is provided a plurality of discharge tubes 108 that extend downwardly from the respective discharge openings 69. These discharge tubes are arranged to receive elongate flexible tubes 110 which are secured thereto by means of a plurality of retainer bands 112. At their lower ends, as shown in FIG. 4, each of the flexible polymer tubes 110 is secured to the respective upper end of a drop tube member 112 by means of a metal retainer band 114. Each of the drop tubes 112 is secured such as by welding to a transverse structural member 116 so that each of the drop tubes is maintained in parallel relation and maintained in optimum spaced relation for dropping catalyist pellets through the bottom opening 118 of each of the drop tubes. The transverse structural member 116 secures the respective drop tubes in a particular spaced and oriented relation that matches the spacing and orientation or pattern of the reactor tubes to be filled. The drop tubes and the structural member 16 thus cooperatively define a charging manifold for simutanous orientation of the drop tubes with respect to the reaction tubes to be filled. For location of the charging manifold relative to the reactor tubes, an elongate structural member 120 is connected to the structural member 116 such as by welding. A pair of locator pins 122 project downwardly from respective extremities of the structural member 120 and have locator guide projections 124 of smaller dimension than the locator pins for ease of entering adjacent reactor tubes and for thus locating the charging manifold in proper position for dropping catalyist pellets into muliple selected reaction tubes. Typically, the charging manifold will have ten drop tubes, each associated with a particular flexible tube 110 and thus associated with a respective catalyist transfer slot of the vibratory tray. It should be borne in mind however that the catalyst loading cart may have more or less catalyst transfer slots and charging manifold tubes as is suitable for the needs of the user.

Figure 9:
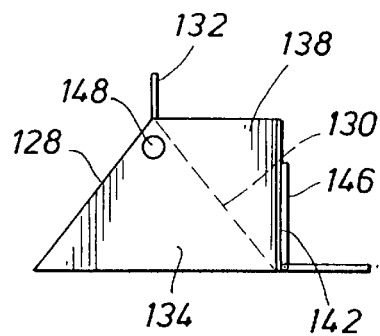
FIG. 9 is an end view of the catalyst dust hood of FIGS. 7 and 8.
Figure 8:
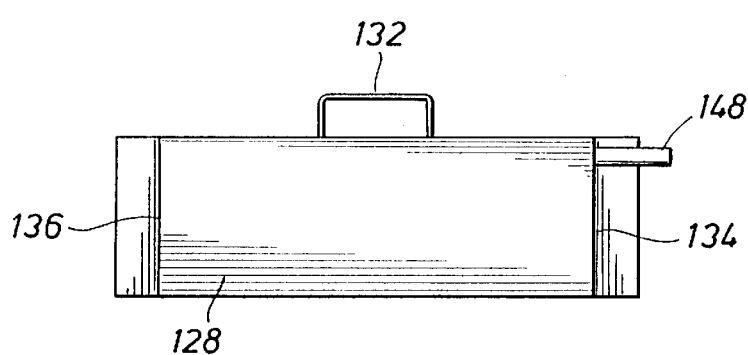
FIG. 8 is a elevational view of the catalyst dust hood of FIG. 7.
Figure 10:
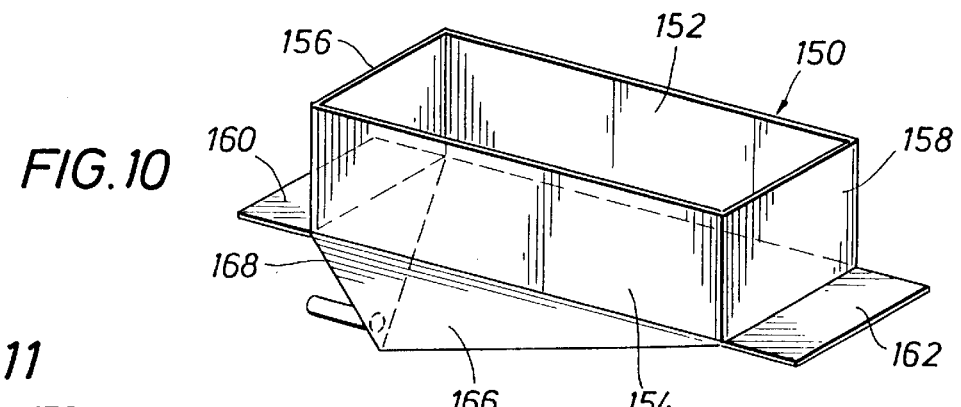
FIG. 10 is an isometric illustration of a vacuum type dust pan that is mounted below the catalyst transfer tray and in registry with dust tailing openings of the catalyst transfer troughs for the purpose of removing the catalyst tailings or dust as the catalyst pellets move through the troughs of the tray.

To provide for efficient removal of catalyst dust, which can contaminate the environmental air of the catalyst loading environment, and to also achieve removal of catalyst tailings, both of which can interfere with proper operation of the catalytic reactor, the catalyst loading cart of FIGS. 1–3 may be provided with a vacuum removal system such as is shown in FIGS. 6–12. For catalyst dust removal, a vent hood 126 shown in FIG. 7 may be pivotally mounted to the upper portion of the vibratory tray. The vent hood is pivotal to a position on top of the vibratory tray for dust removal and is pivotal to an out of the way position for access to the transfer slots and bottom openings of the vibratory tray such as for the purpose of the cleaning. The vent hood is typically composed of sheet metal and defines side panels 128 and 130 that are oriented in angular relation. A handle 132 is fixed to the apex of the vent hood such as by welding and is used for manual pivoting of the vent hood. The vent hood is also provided with end panels 134 and 136 that are fixed to respective ends of the side panels 128 and 130 and project beyond the side panel 130 to define end panel support sections 138 and 140 having mounting flanges 142 and 144 at respective ends thereof. Hinge members 146 are mounted to the flanges 142 and 144 as shown in FIG. 9 to thus provide for pivotal mounting of the hood on the structure of the vibratory tray. The end panel 134 is also provided with a tubular vacuum connection 148 to which a vacuum tube will be connected. During operation, a suitable source of vacuum, such as the vacuum source of a manufacturing facility utilizing a catalytic reactor, will be connected. Thus, most of the catalyst dust that might otherwise be liberated into the environmental air during the catalyst charging operation will be evacuated from the vent hood through the vacuum connection 148.

When a vacuum purged dust and tailing system is desired, a vacuum pan may be provided as shown in FIGS. 10–13. The vacuum pan, shown generally at 150 in FIG. 10, has side panels 152 and 154 to which are connected end panels 156 and 158 so as to define a generally rectangular enclosure. Mounting flanges 160 and 162 project laterally from the bottom portions of the end panels 156 and 158 and provide for support of the vacuum pan by the cart framework in position for receiving tailings and dust that fall through the multiple openings 92 of the bottom of the vibratory tray. The pan structure also defines downwardly converging side panel sections 164 and 166 which are connected to the respective side panel sections 152 and 154. A triangular end panel section 168 extends downwardly from the end panel section 156 and is connected respectively to the side panel sections 164 and 166. These panel sections are assembled so that any dust or tailings that fall into the pan will descend downwardly to a pan bottom 170. A vacuum connection 172 is fixed to the end panel section 168 and also provides for connection of a vacuum tube of a vacuum supply so that dust and tailings from the pan will be transported by the vacuum away from the loading site to suitable facility for reclamation or disposal. During use, the support flanges 160 and 162 simply rest on the framework structure of the catalyst loading cart so that from time to time the pan structure 150 may be removed from the cart and cleaned of any residual catalyst dust that might be present on the inside surfaces thereof With reference now to FIG. 14, an alternative embodiment of the present invention is shown generally at 180 which comprises an catalyst loading cart mechanism having a catalyst charging manifold that is adapted for upward and downward movement relative to the vibratory tray thereof so as to facilitate catalyst loading operations even under circumstances where the retractable wheels thereof are permitted to remain extended. This type of catalyst loading apparatus may also facilitate elimination of the retractable wheel assembly of a catalyst loading cart so that casters or wheels of other types may be physically attached to the framework so that the cart is always capable of rolling on the tube sheet surface of a reactor. The casters of the cart can be provided with brakes to prevent inadvertent movement of the catalyst loading cart during a charging operation. The catalyst loading cart 180 of FIG. 14 will incorporate a framework structure shown generally at 182 which may take the general form shown in FIGS. 1–3. The framework defines a generally rectangular framework base 184 having a pair of vibrator supports 186 and 188 projecting upwardly therefrom and having cross members 190 and 192 to which structural components of a pair of electronic vibrators 194 are mounted. Vibrator elements 196 and 198 of the vibrators are operatively connected to a generally horizontally oriented vibratory tray so that electronic activation of the vibrators will induce vibratory motion to the vibratory tray. A hopper 202 is welded or otherwise fixed to the upper portion of the vibratory tray and will take the form shown in FIGS. 1–3, having a plurality of internal hopper compartments and being closed by a simple removable or pivotal closure member 204. The vibratory tray may be of the same configuration and dimension as shown in FIGS. 1–3, having an adjustable weir 206 for controlling discharge of catalyst pellets from the multiple compartments of the hopper. The vibratory tray structure will also define a bottom panel having a section with a multiplicity of openings such as shown at 92 in FIG. 3 for permitting catalyst tailings and dust to drop therethrough into a receiving pan. The vibratory tray will also be provided with a vent hood such as shown at 208 and a collection pan structure shown at 210. The vent hood and collection pan may both be subject to continuous evacuation via vacuum connection tubes 212 and 214 to which vacuum conduits are connected in the same manner as described above in connection with FIGS. 7–13.

For retractable mounting of casters to thus enable the catalyst loading cart to rest on its cushioned legs 216 and 218 or to rest on caster wheels 220 and 222, a pair of caster positioning plates 224 and 226 are connected by pivots 228 and 230 to respective transverse structural supports 232 and 234 of the cart framework structure. A centrally located linear actuator 236 is also fixed at the lower end thereof to the framework 182 and is arranged to drive connectors or linkages for accomplishing pivoting of the wheel support plates 224 and 226 about their respective pivots and thus retract the caster wheels 220 and 222 upwardly to permit the cushioned legs 216 and 218 of the framework to rest on the upper tube sheet of the catalytic reactor. Also, if desired, the same type of actuator energized wheel retraction system that is shown in FIGS. 1–3 may be incorporated within the catalyst loading cart of FIG. 14. As a further alternative, if desired, the caster retraction mechanism may be eliminated and the caster wheels 220 and 222 may be connected directly to the leg structure of the loading cart framework. For purposes of control, the loading cart mechanism 180 is provided with a control housing or consol 238 that may conveniently take the form shown at 54 in FIGS. 1–3.

Figure 14:
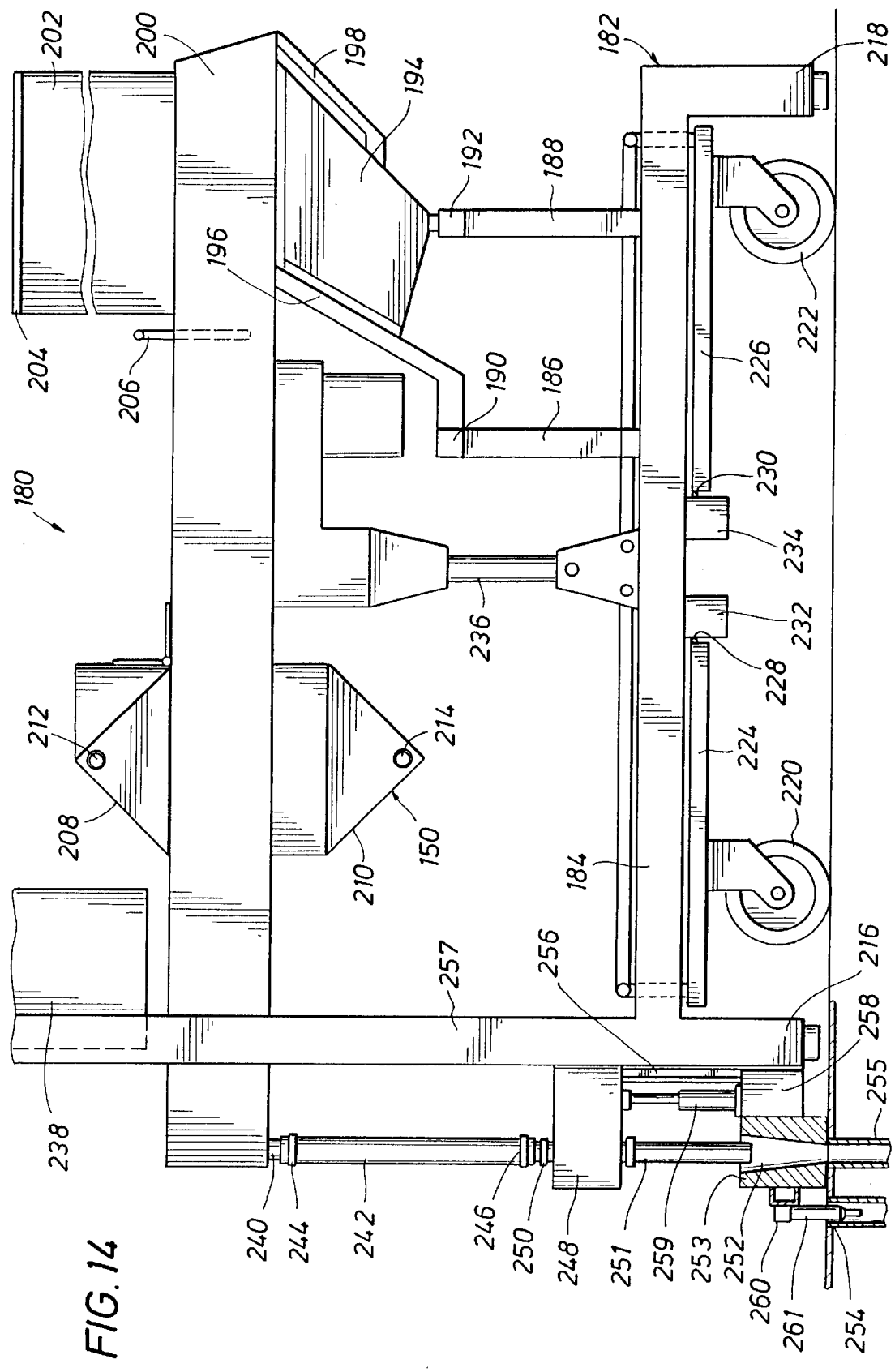
FIG. 14 is a side elevational view of a catalyst loading cart representing an alternative embodiment of the present invention wherein a lower charging manifold thereof is subject to controllable raising and lowering relative to the reaction tube openings to be charged thereby.

It is considered desirable where the catalyst loading cart mechanism is provided with retractable caster wheels or not, to provide a catalyst loading manifold that can be independently raised and lowered to promote the efficiency of the catalyst loading operation. To accomplish this feature, the vibratory tray 200 is provided with a plurality of catalyst drop tubes 240 that project downwardly from the vibratory tray and are each in communication with respective catalyst transfer slots of the vibratory tray. The upper ends of a plurality of flexible conduits 242, typically composed of a polymer material, are connected to each of the drop tubes by means of metal retainer bands 244 while the lower ends of the flexible conduits are connected to upwardly projecting tubular connectors 146 of a fixed manifold 248 by metal retainer bands or clamps 250. The fixed manifold 248 is immovably connected to the framework 182 such as by bolting and is provided with a plurality of downwardly projecting telescoping tubes 251 which are telescopically received within a plurality of telescoping passages 252 of a movable charging manifold 253. The charging manifold, when in its lowermost position, is adapted to rest on the reactor tube sheet 254 as shown in FIG. 14 and serves to conduct dropping catalyst pellets into selected reactor tubes 255. For guided movement of the charging manifold, guide bars or tracks 256 are fixed to framework legs 257 and are movably engaged by a slide member 258 which is fixed to the movable charging manifold. A linear actuator 259 is interposed between the fixed manifold 248 and the movable charging manifold 253 and is operative to move the charging manifold downwardly as needed to position the charging manifold in registry with selected reaction tubes and upwardly to permit movement of the catalyst loading cart between tube charging operations. As the charging manifold is moved upwardly and downwardly the telescoping tubes 251 maintain their telescoping relationship within the manifold passages 252. For locating the charging manifold in charging position with respect to a group of reactor tubes to be simultaneously charged with catalyst pellets, the charging manifold is provided with a manifold locator structure 260 having a pair of locator pins 261 that are in fixed relation with the charging manifold and are adapted to be received within reaction tube openings that are located adjacent the reaction tubes to be charged. When the locator pins are inserted into selected reaction tubes during lowering of the charging manifold into engagement with the tube sheet the plurality of charging passages, typically 10, will move into charging registry with a like number of reaction tubes to be simultaneously charged with catalyst pellets. If desired, the manifold locator structure may conveniently take the form shown in FIG. 4.

Figure 15:
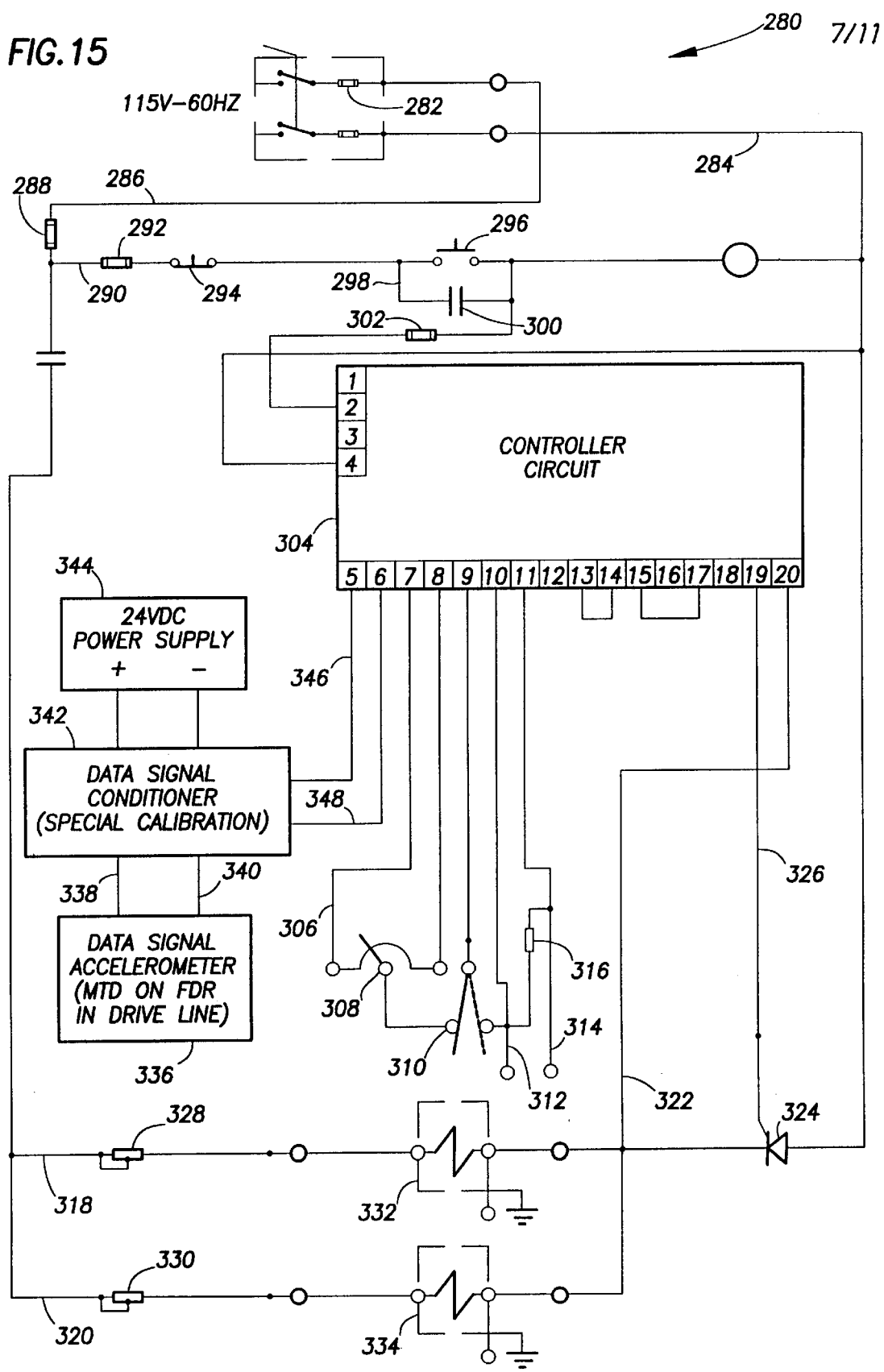
FIG. 15 is an electronic schematic illustration of a portion of the control circuitry for the catalyst loading cart of the present invention illustrating the vibration trimmer system and the automatic accelerometer controlled trimming circuitry for controlling vibration characteristics of the vibratory tray responsive to catalyst weight.
Figure 16:
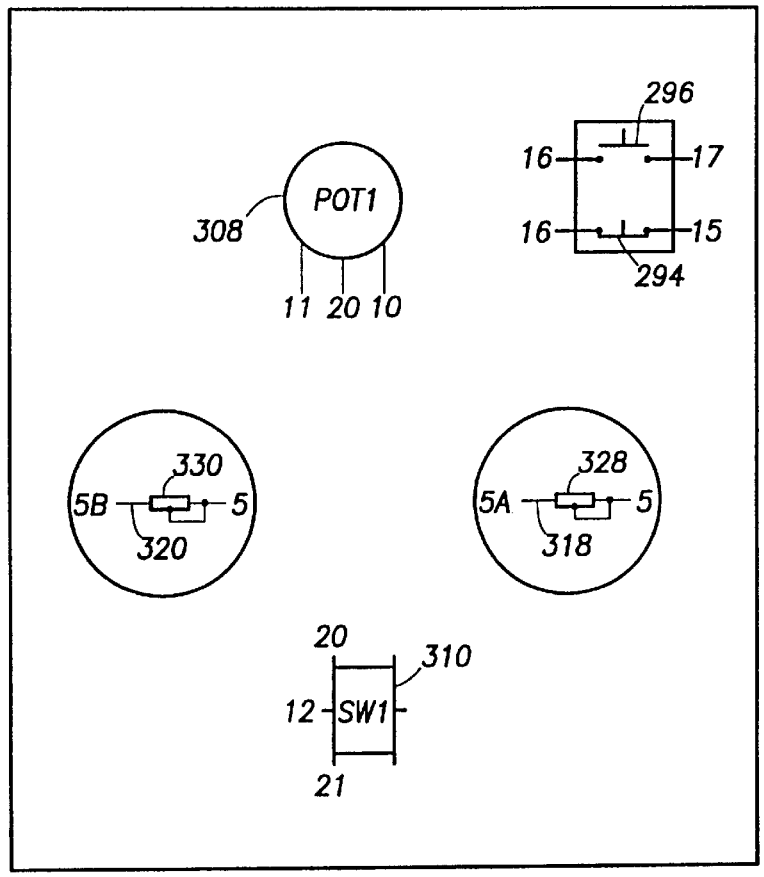

For purposes of electrical operation and control, the catalyst loading cart of this invention is provided with electronic circuitry which is shown by FIGS. 15, 16 and 17, with FIGS. 16 and 17 showing the layout of circuit components of the control panel and within the control consol 54 or 238 as the case may be. As shown in FIG. 15, the electronic circuitry shown generally at 280 is provided with a disconnect switch assembly 282 through which the circuitry is connected to a suitable source of electrical energy, such as the power supply system of a manufacturing facility. The circuitry which incorporates a neutral conductor 284 and a positive conductor 286 is provided with a master fuse 288 which will interrupt the circuit in the event of any power overload to thereby protect the circuitry from overload damage and to ensure against damage to other electronic components that are controlled by the circuitry. A start and run conductor 290 is connected across conductors 284 and 286 and includes a fuse 292 that will interrupt the circuit in the event of circuit overload. The circuit 290 is also provided with a stop switch 294 which will be manually manipulated by the user of the equipment when shut down of the circuitry is desired. The circuitry also incorporates a start and run circuit incorporating an normally open start switch 296 which will energize a run circuit 298 across a relay contact 300. The run circuit is also provided with a protective fuse 302 and is connected for energy supply to a controller circuit 304. The controller circuit is provided with a master potentiometer circuit 306 having a potentiometer 308 which is also shown as a panel component of the control panel shown in FIG. 16. The stop and start switches 294 and 296 are also shown in the panel display of FIG. 16. The potentiometer 308 is connected with a mode switch 310 having one operative position as shown in full line in FIG. 15 and a second operative position as shown in broken line. The mode switch is also shown in the inside cover panel display of FIG. 16 where it is positionable between manual and automatic mode settings. In the broken line position of the mode switch, the master potentiometer circuit is operative via conductors 312 and 314, with a resistor circuit 316 connected across these same conductors. The master control conductors 312 and 314 receive a four volt 20 milliamp dc input signal as shown in FIG. 15.

The circuitry is also provided with trimmer circuits 318 and 320 which are both connected to a controller circuit 322 and connected to neutral conductor across an SCR 324 with the gate voltage of the SCR being provided by a gate circuit 326 of the controller circuit. The trimmer circuits are provided respectively with potentiometers 328 and 330 which control adjustment of the amplitude of the vibration of the vibrators 58 and 60 of FIGS. 1–3 and vibrators 94 of FIG. 14. Vibrator trimmer adjustment is accomplished by controlling electromagnet circuits 332 and 334 via the trimmer potentiometers 328 and 330. As mentioned above, by trimmer adjustment of each of the dual vibrators of the vibratory tray, the characteristics of tray vibration can be controlled to efficiently transfer catalyst pellets along the length of the individual slots or troughs and to achieve virtually identical catalyst drop time from each of the troughs of the vibratory tray. This feature facilitates efficient and even loading of catalyst material into the reaction tubes to thereby achieve the result of quite even catalyst compaction within the tubes so that the resulting performance of the catalytic reactor will be at its optimum level. After the trimmer potentiometers have been properly adjusted, to vary the catalyst drop rate into the reaction tubes, the master potentiometer 308 may be appropriately adjusted to increase or decrease the amplitude of tray vibration and thus the catalyst drop rate. The vibratory apparatus, when controlled in the manner shown by FIG. 15, will achieve repeatable quality loading operations well beyond the quality of catalytic reactor loading that can be accomplished even by hand loading operations.

As mentioned above, one of the objections that can be encountered in automated catalyst loading operations is that changes in the drop time of catalyst will vary responsive to the decreasing weight of the catalyst material within the loading hopper. When the catalyst loading hopper is full of catalyst pellets, the weight of the catalyst material will cause the vibratory tray to have small amplitude vibrations (because of the combined weight or mass of the vibratory tray, the hopper and the catalyst contained within the hopper) thereby achieving a particular catalyst drop rate even though the rate of vibration does not change. As the weight of the catalyst material within the hopper then decreases during a loading cycle, as the catalyst in the hopper is depleted, the amplitude of the vibrations of the vibratory tray will increase, with maximum vibration amplitude occurring as the hopper chambers become nearly empty. Even though the rate of vibration does not change, the amplitude of the vibration changes significantly and causes consequent variation in the drop rate of the catalyst during the charging cycle. It is desirable, therefore, to provide a suitable system for controlling the vibration of the vibratory tray so that the amplitude of the vibratory movement of the vibratory tray remains substantially constant during a catalyst loading cycle regardless of the changes of catalyst weight within the hopper. This feature is accomplished through the provision of catalyst weight related input signals that are then conditioned and provided to the controller circuit 304 for controlling the amplitude output of the electronic vibrators 58 and 60 responsive thereto. This is achieved in accordance with the present invention by providing an accelerometer 336 which is mounted on the vibratory tray 56 and provides a weight sensitive signal output via conductors 338 and 340 reflecting the amplitude of tray vibrations. These weight sensitive electronic signals are then processed by a data signal conditioner circuit 342 which is powered by a 24 volt dc power supply 344 and provides conditioned output signals via conductors 346 and 348 to the control circuit 304 as shown in FIG. 15. During a catalyst loading cycle, the weight responsive signals of the accelerometer 336 will have characteristics that change during the complete catalyst charging cycle. The conditioned, weight responsive output signals received by their controller circuit are then used to vary the operational control of the electronic vibrators 58 and 60. In this manner, the vibrators are controlled such that the vibrational amplitude remains substantially constant from the beginning to the end of a catalyst charging cycle so that the drop rate of catalyst from the vibratory tray will remain substantially constant throughout the catalyst charging cycle.

As mentioned above, catalyst material is typically premeasured into small bags and is provided at a supply point adjacent the tube sheet of the reactor or in a container on the tube sheet. To charge individual reactor tubes by a manual charging procedure, a funnel is located with its discharge spout inserted into the reactor tube to be charged. The worker will then open a premeasured bag and carefully pour the catalyst contents thereof into the funnel, with pouring being manually controlled so that the drop rate of the catalyst is controlled according to the drop rate that is desired. Any catalyst dust and tailings that are poured from the bags into the funnel will logically fall into the reactor tube being charged. In the event the worker should inadvertently drop the catalyst bag, some catalyst material can enter other reactor tubes. When this occurs the improperly filled tubes of the reactor will likely be emptied of catalyst and subsequently properly recharged. Should the worker pour the catalyst into the funnel at a rate that is too slow or too fast the reaction tube being charged will be subject to improper compaction, bridging voids, etc.

When the catalyst loading cart of the present invention is employed, it is desirable during catalyst loading operations that the catalyst loading cart remain located in the vicinity of reactor tubes to be filled and that it be periodically charged with catalyst pellets. To replenish its hopper with catalyst pellets, a suitable means be employed to transport measured quantities of catalyst material from a supply point to the catalyst loading cart. It is also important to accomplish transport of the catalyst material from the supply point to the tube sheet of the reactor and to the catalyst loading cart in such manner that inadvertent spillage of catalyst material will not occur. It is also desirable to provide a system for charging the various compartments of the loading cart hopper with precisely measured quantities of catalyst pellets so that the production of the charging operation may continue at a high level without risking improper hopper charging. To accomplish these features, a portable catalyst charging hopper may be provided as shown generally at 350 in FIGS. 18 and 19. The catalyst charging hopper is basically a rectangular housing structure having parallel side walls 352 and 354 and parallel end walls 356 and 358. Internally, the charging hopper is provided with a plurality of internal partitions 358, being the same number of partitions as are provided within the hopper 72 shown in FIGS. 1–3 and defining the same number of internal hopper charging chambers as the compartments of the hopper of the catalyst loading cart. For example, if the hopper of the catalyst loading cart is provided with ten internal chambers for feeding catalyst to ten elongate troughs of the vibratory tray, the charging hopper will also be provided with ten internal catalyst chambers. Each of the chambers of the charging hopper will be of identical internal dimension for ensuring charging of each of the chambers of the loading cart hopper with substantially identical volumes of catalyst.

The bottom of the charging hopper is open but is temporarily closed by a slide plate or gate 362 which is movable through an elongate slot 364 of the charging hopper side wall 352 and guided by internal guides within the charging hopper. When the charging gate 362 is fully inserted into its slot 364, it forms a temporary bottom wall for the charging hopper and serves to retain catalyst pellets within the respective catalyst chambers 360. The charging gate is movable from the closed position to the open or withdrawn position shown in FIG. 18 to dump catalyst pellets from the respective chambers 360 thereof into respective hopper compartments 76 of the hopper 72. The charging hopper is also provided with a closure panel 366 which is connected by one or more hinges 368 to the upper end side wall 354. The closure panel 366 and the side wall 352 are provided with interlocking latches that will secure the closure in its closed position after it has been loaded with catalyst material. For the purpose of catalyst loading, the slide gate 362 will be inserted into the side wall slot 364 to its full extent and catalyst material will be poured into the respective chambers 360. Typically, for rapid but accurate loading of the charging hopper, the chambers 360 will be overfilled and a screed member having a straight edge will be used to scrape away the surplus catalyst. The upper ends of each of the partitions 359 are at the same level as the upper ends of the side and end walls of the charging hopper. When the charging hopper has been filled in this manner the catalyst charges of each of the charging compartments thereof will contain virtually the same volume of catalyst pellets.

Figure 18:
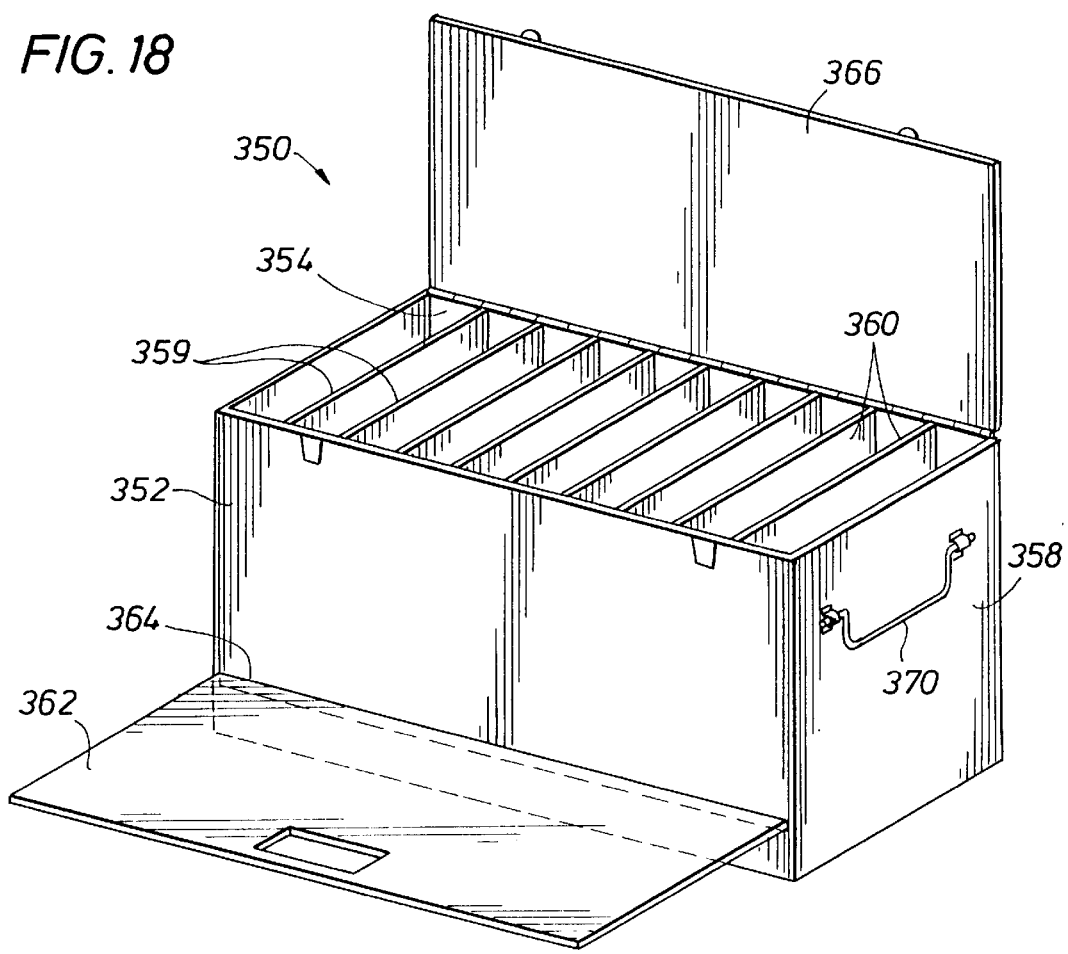
FIG. 18 is an isometric illustration of a catalyst charging hopper which is utilized to quickly transfer measured quantities of catalyst pellets to the respective hopper compartments of the catalyst loading cart.
Figure 19:
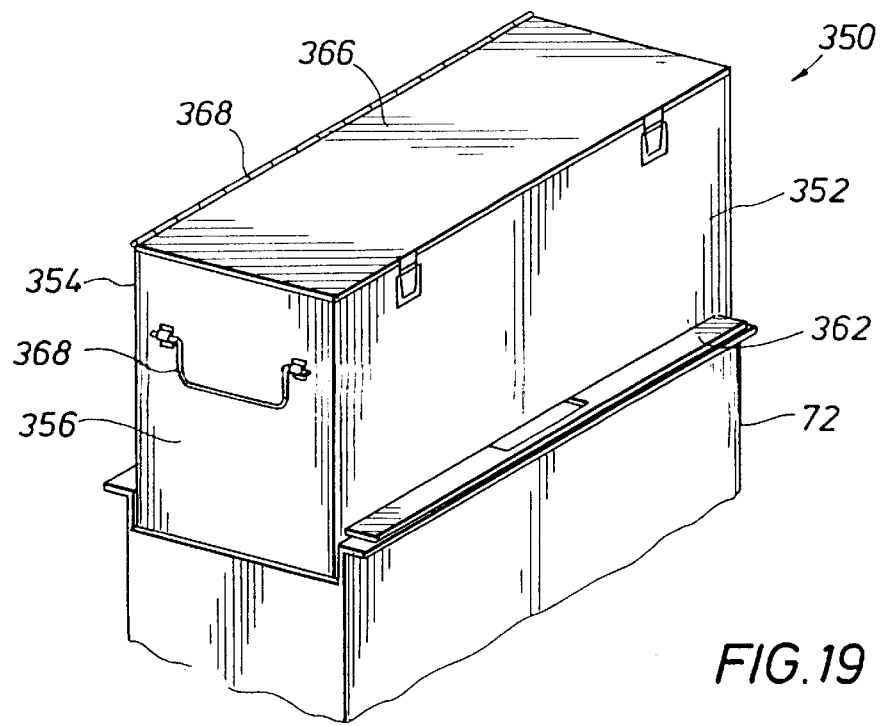
FIG. 19 is an end elevational view of the catalyst charging hopper of FIG. 15 showing its position relative to the hopper structure for charging the hopper compartments with catalyst material.

As shown in FIG. 19, a lower portion of the charging hopper, below the slide gate opening 364, is inserted into the upper end of the hopper 72 of the catalyst loading cart. After the charging hopper has been so positioned, the slide gate 362 may be grasped and moved to the open or withdrawn position shown in FIG. 18, thus dropping the catalyst material within the hopper chambers 360 into the respective hopper compartments of the hopper 72. The charging hopper is adapted to be carried by a single worker and incorporates handles 368 and 370 mounted to the respective end walls which facilitate its manual lifting and carrying.

By employing the catalyst charging hopper, it becomes unnecessary to accomplish any catalyst loading immediately above the reactor and under circumstances when it is possible to inadvertently drop catalyst pellets on the reactor tube sheet and into the reactor tubes. A source of catalyst pellets will be maintained externally of the circular bounds of the reactor shell, typically in an anteroom located to one side of the reactor shell. Workers will locate one or more catalyst charging hoppers in the anteroom and, after closing the sliding gate thereof, will fill each of the multiple chambers thereof with catalyst pellets. These multiple chambers are each of the same dimension and configuration and will each contain a precisely measured volume of catalyst material. After the catalyst charging hopper has been properly filled, its closure will be closed and latched to secure the catalyst pellets within the multiple compartments thereof. Even under circumstances where a worker should fall while carrying the charging hopper on the reactor tube sheet, the charging hopper will maintain its integrity and contain the catalyst against potential spillage. The worker will then position the charging hopper in registering assembly atop the hopper of the catalyst loading cart as shown in FIG. 19, after which the worker will pull the slide gate closure to its open position as shown in FIG. 18, thus dumping the measured charges of each of the multiple compartments thereof into respective compartments of the hopper of the catalyst loading cart. Thereafter, the catalyst charging hopper is returned to the anteroom, where it is again loaded with catalyst pellets as indicated above in preparation for quick, efficient and accurate loading of the hopper compartments of the loading cart with precise volumes of catalyst pellets. By using a number of catalyst charging hoppers the reaction tube charging operation can be rapidly conducted without in any manner sacrificing the integrity and accuracy of the reactor charging operation. A reactor charging operation, which might require a two week period to complete by hand loading operations, can be done in three to four days time and with much improved accuracy when a catalyst loading cart is employed having the capability for simultaneous 10 tube mechanized reactor charging. The labor savings of such a mechanized reactor charging operation is obvious.

Referring now to FIGS. 20 and 21, automated apparatus for measured filing of multi-compartment charging hoppers is shown generally at 380 and comprises a base structure shown generally at 382 having vertically oriented support legs 384 and horizontal strut members 386 having the ends thereof connected to the support legs. Thus, the base structure 382 is of generally rectangular configuration. The upper portion of the base structure is defined by a generally horizontal platform 388 having a pair of parallel rails 390 and 392 fixed thereto. The parallel rails define a guide track for a charging hopper transfer trolley to be discussed in detail hereinbelow. Beneath the horizontal platform 388 there is provided a catalyst overage chute having inclined walls and a bottom opening 396 for directing descending catalyst pellets from the overage chute opening into a catalyst overage receptacle 398 that is adapted to rest on a floor 400 or other suitable surface within the rectangular enclosure defined by the base structure 382.

Figure 22:
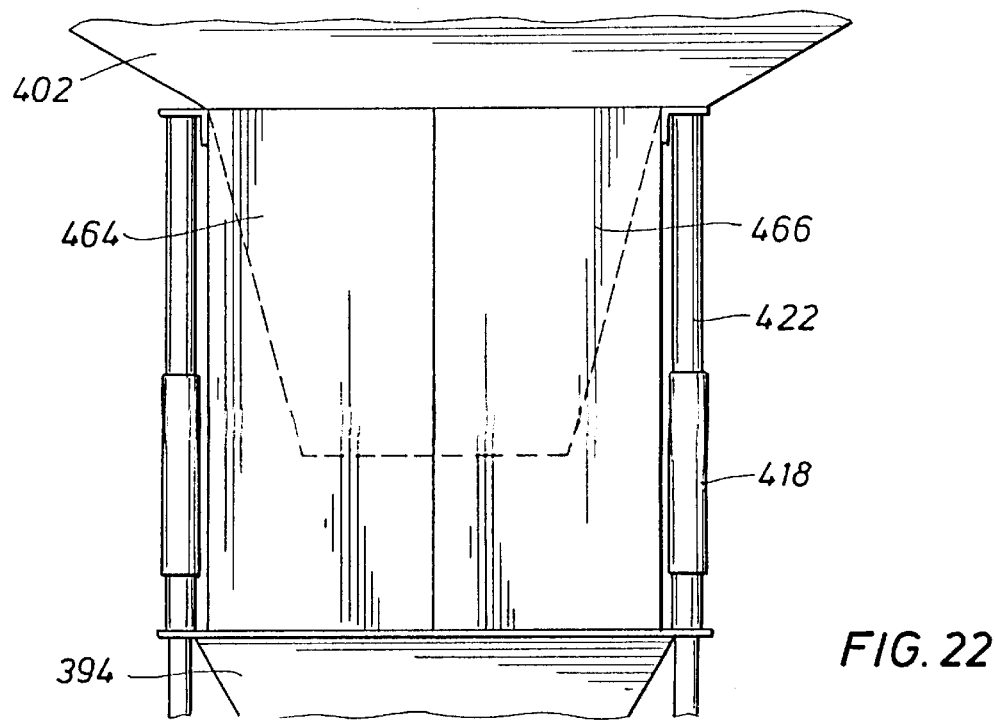
FIG. 22 is a partial front elevational view of the automated catalyst charging hopper loading mechanism of FIGS. 20 and 21, showing the access doors thereof in their closed positions.

A bulk catalyst hopper 402 is supported above the base structure 382 in such manner that catalyst pellets descending from a bottom discharge opening 404 of the hopper will fall into the multiple measuring compartments of a charging hopper 350, described above in connection with FIGS. 18 and 19. The bulk catalyst hopper 402 is provided with a bottom closure gate 406 having pivot arms 408 and 410 that are pivotally connected to tapered side walls 412 and 414 of the bulk catalyst hopper. The discharge control gate 406 is adapted for controlling movement by a gate operator 416 in the form of a linear pneumatic motor. To accommodate catalyst charging hoppers of differing height, the bulk catalyst hopper 402 is adjustably support so that the discharge opening at the bottom of the hopper can be selectively positioned with respect to the upper portion of a charging hopper. To facilitate such adjustable support, a plurality of hopper lift jacks 418 are connected to the upper portion of the base structure 382 preferably extending upwardly from the horizontal platform 388. Although the hopper lift jacks 418 are shown to be of the manually operable variety having rotatable crank handles 420 for manually controlling operation thereof, the hopper lift jacks may also be of any suitable mechanized variety if desired. The hopper lift jacks 418 are provided with hopper support struts 422 having the upper ends thereof either connected directly to the bulk catalyst hopper 402 or, as shown in FIGS. 21 and 22 having the upper ends thereof connected to horizontally oriented hopper support elements 424 and 426. Thus, as the crank handles 420 of the hopper lift jacks 418 are rotated, the bulk catalyst hopper is raised or lowered depending upon the direction of handle rotation to thereby position the bottom discharge opening 404 of the hopper as selectively desired relative to the charging hopper 350.

For charging hopper loading, it is desirable to as much as possible eliminate any manual loading operations that would otherwise be required so that the charging hoppers may be filled in identically the same manner during each filling cycle so that at each loading operation the charging hoppers will be identically filled with accurately measured volumes of catalyst pellets. One suitable means for accomplishing this purpose is to provide a movable charging hopper transfer trolley shown generally at 428 which incorporates a trolley framework 430 which is adapted to receive the bottom portion of a charging hopper and thus provide for controlled movement of the charging hopper between a start position where the charging hopper is available for manual access and a fill position where the charging hopper is located to receive discharge of catalyst pellets from the bottom discharge opening of the bulk catalyst hopper. The charging hopper framework 430 is provided with a plurality of trolley support wheels 432 which are designed for guiding engagement with the rails 390 and 392 of the trolley guide track. For controlled movement of the transfer trolley 428, a mechanized trolley actuator 434 is provided which may conveniently be in the form of a linear pneumatic motor having a linear drive shaft 436 thereof connected in driving relation with the trolley 428. The trolley actuator 434 will have the capability for linear movement of the trolley 428 between the start and fill positions of the charging hopper 350 relative to the bottom discharge opening 404 of the bulk catalyst hopper.

During filling of the charging hopper 350, upon opening movement of the discharge gate 406 of the hopper, it is desirable to ensure adequate settling of the hopper pellets so that each of the catalyst measuring chambers of the charging hopper will be properly filled to thus define equally measured volumes of catalyst in each of the measuring compartments thereof. Accordingly, the transfer trolley 428 is provided with a vibrator 438 which is energized during the filling cycle and which is de-energized when the transfer trolley 428 is at positions other than the hopper fill position. If desired, the vibrator 438 may also be energized during a certain stage of movement of the transfer trolley from the hopper fill position to the start position.

For control purposes, the charging filling mechanism is provided with a pneumatic control circuit 440 and an electronic control circuit 442. The pneumatic control circuit 440 will have an operator circuit that is controllably connected to the trolley actuator 434 and a hopper gate actuator circuit 446 that is connected for control of the gate actuator 416. The pneumatic actuator circuits 444 and 446 are controlled by solenoid or other electromechanical valve of the pneumatic control circuit via control signals from the electronic control circuit 442. The electronic control circuit is provided with appropriate timing circuits and switching for providing adjustable timing control for the filing cycle of the charging hopper and for sequence control of the hopper transfer trolley and the discharge control gate of the hopper. The electronic control circuitry also includes a start switch 448, a stop switch 450 and an emergency stop switch 452 thereby allowing operating personnel to manually initiate or stop the charging hopper filling cycle and to manually shut-down the system in the event emergency conditions should arise. Preferably, the start, stop and emergency stop switches will be in the form of lighted contact buttons thereby enabling operating personnel to have visual indication of the operating condition of the charging hopper filling system.

Since charging hopper filling is accomplished volumetrically, it is desirable to ensure that each of the open topped measuring compartments of the charging hopper 350 contain a precisely measured volume of catalyst pellets when the charging hopper is returned to the start position by the hopper transfer trolley 428. One suitable means for accomplishing this feature is to provide a catalyst leveling element that is supported by the hopper structure or the hopper support framework and is operative upon movement of the charging hopper by the hopper transfer trolley from the fill position to the start position to engage and wipe or brush away any excess catalyst from the upper portion of the charging hopper. As shown particularly in FIG. 20, the catalyst leveling element 454 may conveniently take the form of a rotatable leveling brush that is rotated by an electrical drive motor 456. After the hopper fill cycle has continued for a sufficient period of time that all of the measuring compartments of the charging hopper have been filled and excess volume of catalyst is present on the upper portion of the charging hopper, the transfer trolley 428 will move the charging hopper from the fill position toward the start position. During initial movement of the transfer trolley, the charging hopper will be moved relative to the rotating catalyst leveling element 454 thereby causing excess catalyst to be brushed away from the upper portion of the charging hopper and to descend by gravity into the overage chute 394 where it is then conducted into the catalyst overage receptacle 398. Although the catalyst leveling element is shown to be in the form of a rotatable motor driven leveling brush, it is not intended to limit the spirit and scope of the present invention to this specific structure. It should be borne in mind that other leveling elements, such as a stationary brush, a mechanical weir, or other suitable leveling elements may be effectively utilized without departing from the spirit and scope of this invention. It is only appropriate from the standpoint of the present invention that leveling of the charging hopper by removal of excess catalyst be accomplished in the same manner during each loading cycle. Any suitable leveling apparatus may be utilized that will accomplish this purpose.

During dispensing of catalyst from the hopper 402 into the charging hopper 350 is likely to generate a small quantity of catalyst dust simply because of the dust present on the catalyst pellets. Since this catalyst dust may be hazardous to the health of workers, it is desirable to ensure that the presence of catalyst dust is minimized. For this purpose, the bulk catalyst loading mechanism 380 is provided with a mechanical shroud having side walls 458 and 460, a rear wall 462 and a front wall defined by a pair of door panels 464 and 466 which are best seen in FIG. 22. The door panels are moveable between an open position permitting access to a catalyst charging hopper at the start position and a closed position preventing access to a charging hopper by operator personnel. The access doors 464 and 466 are provided with a door lock system 468 which is integrated with the electronic controlled circuitry so that the charging hopper loading apparatus will not operate so long as the access doors are open. When the access doors are closed and an electrical circuit is completed, which allows operation of the loading system. This feature prevents operating personnel from potential danger as the hopper transfer trolley moves between its start and fill positions. The dust shroud thus defines a substantially closed charging hopper filling enclosure 468 to which most of the catalyst dust will be restricted. This enclosure is vented by a source of vacuum V that is communicated by a vacuum conduit 470 to a vacuum connector 472 that is received at a vent opening 474 of a shroud wall 458. Thus, during operation of the charging hopper loading mechanism, the enclosure 468 is continuously vented so that any catalyst dust that is liberated into the enclosure 468 is pulled away by the vacuum vent system, thereby permitting workers to have a relatively dust-free environment within which to work.

As will be readily apparent to those skilled in the art, the present invention may be produced in other specific forms without departing from its spirit scope and essential characteristics. The present embodiment is therefore to be considered as illustrative and not restrictive, the scope of this invention being defined by the claims rather than the foregoing description, and all changes which come within the meaning and embraced therein.

In view of the foregoing, it is evident that the present invention is one well adapted to attain all the objects and features hereinabove set forth, together with other objects and features which are inherent in the apparatus disclosed herein.

As will be readily apparent to those skilled in the art, the present invention may be produced in other specific forms without departing from it spirit or essential characteristics. The present embodiment, is therefore, to be considered as illustrative and not restrictive, the scope of the invention being indicated by the claims rather than the foregoing description, and all changes which come within the meaning and range of the equivalence of the claims are therefore intended to be embraced therein.

What is claimed is:

1. Apparatus for filling a portable multiple compartment catalyst charging hopper having wall means and partition means defining a plurality of equal volume measuring compartments such that the measuring compartments contain substantially identical volumes of catalyst, comprising:

(a) a base structure;

(b) a bulk hopper being supported by said base structure and having a discharge outlet;

(c) a discharge gate being supported for movement relative to said discharge outlet by motive means and being movable to an open position permitting discharge of catalyst from said discharge outlet and being movable by said motive means to a closed position blocking the discharge of catalyst from said discharge outlet;

(d) a trolley platform being supported by said base structure;

(e) a trolley being movable on said trolley platform and being adapted for support of a portable catalyst charging hopper and being movable between a start position where the portable charging hopper is manually accessible and a fill position where the portable catalyst charging hopper is positioned beneath said discharge outlet for receiving catalyst from said discharge outlet;

(f) a mechanized trolley actuator being mounted to said base structure for moving said trolley and said portable catalyst charging hopper from said start position to said fill position and for returning said trolley and said portable catalyst charging hopper from said fill position to said start position; and (g) a catalyst leveling element being selectively positionable relative to said portable charging hopper for removing excess catalyst from the portable catalyst charging hopper during said returning of said trolley and said portable catalyst charging hopper from said fill position to said start position.

2. The apparatus of claim 1, wherein;

(a) said trolley platform defining a track extending from said start position to said fill position;

(b) said trolley having wheels having rolling engagement with said track; and (c) said mechanized trolley actuator for moving said trolley and said portable catalyst charging hopper being a linear motor mounted to said base structure and having linear driving connection with said trolley.

3. The apparatus of claim 1, wherein;

said catalyst leveling element for removing excess catalyst from said portable catalyst charging hopper comprising;

a brush disposed for engagement with excess catalyst on said portable catalyst charging hopper during movement of said trolley and said portable catalyst charging hopper from said fill position to said start position.

4. The apparatus of claim 3, wherein;

a vibrator being mounted to said trolley platform and, when energized, causing vibration of said trolley for settling catalyst within each of the plurality of measuring compartments of the portable and, when energized, causing vibration of said trolley for settling catalyst within each of the plurality of measuring compartments of the portable catalyst charging hopper.

5. The apparatus of claim 3, wherein;

said brush being a rotary brush driven by a rotary motor adjustably supported by said base structure.

6. The apparatus of claim 1, comprising:

(a) a base structure; and (b) position adjusting means adjustably supporting said bulk catalyst hopper on said base structure and being adapted for controlled elevational positioning of said bulk catalyst hopper relative to said base structure and relative to a portable catalyst charging hopper positional on said trolley.

7. A method for filling a multi-compartment portable catalyst charging hopper having side and end walls and a plurality of internal partitions with a measured quantity of catalyst within each of the multiple measuring compartments thereof such that the measuring compartments contain substantially identical volumes of catalyst and wherein a mechanized charging hopper filling system is provided having a support base to which is connected a bulk catalyst hopper having an open top and side walls and defining a discharge outlet and having a discharge gate movable to an open position by motive means to permit discharge of catalyst into said portable catalyst charging hopper and a closed position by said motive means blocking discharge of catalyst from said discharge outlet and having a trolley support platform on said support base and a trolley linearly movable on said trolley support platform and being movable by a mechanized trolley actuator mounted to said support base and a catalyst leveling element being selectively positionable relative to said portable charging hopper for removing excess catalyst from the portable catalyst hopper during said returning of said trolley and said portable catalyst hopper from said fill position to said start position, said method comprising:

(a) positioning a portable catalyst charging hopper on said trolley and moving said trolley and said portable catalyst charging hopper from a start position to a fill position to receive discharge of catalyst from said discharge outlet of said bulk catalyst hopper;

(b) opening said discharge gate for a sufficient period of time to overfill each of said multiple measuring compartments of said portable catalyst charging hopper;

(c) closing said discharge gate;

(d) moving said trolley and said portable catalyst charging hopper on said trolley support platform from said fill position and simultaneously removing excess catalyst from each of the measuring compartments of said portable catalyst charging hopper; and (e) stopping linear movement of said trolley and said portable catalyst charging hopper at said start position.

8. The method of claim 7, comprising:

during said linear movement of said trolley and said portable catalyst charging hopper from said fill position to said start position, wiping excess catalyst from said portable catalyst charging hopper.

9. The method of claim 7, comprising:

vibrating said portable catalyst charging hopper during filling thereof at said fill position to settle catalyst within the multiple measuring compartments thereof to ensure accuracy of volumetric measurement by each of said multiple measuring compartments thereof.

10. The method of claim 7, comprising:

(a) moving said trolley and said portable catalyst charging hopper linearly from said fill position to said start position; and (b) during said moving of said trolley and said portable catalyst charging hopper linearly from said fill position applying a wiper to the excess catalyst present on said portable catalyst charging hopper to wipe away the excess catalyst and ensure accuracy of volumetric measurement of each of said multiple measurement compartments thereof.

11. The method of claim 10, wherein said wiper being a brush, said method comprising:

moving said trolley and said portable catalyst charging hopper linearly beneath said brush to brush away the excess catalyst from each of said multiple measuring compartments.

12. The method of claim 11, wherein said wiper being a movable brush driven by a motor supported by said support base, said method comprising:

during said moving of said trolley and said portable catalyst charging hopper linearly from said fill position, moving said brush against the excess catalyst to brush away the excess catalyst and leave accurately measured volumes of catalyst in each of said multiple measuring compartments thereof.

13. The method of claim 11, wherein said brush is a rotary brush driven by a rotary motor supported by said support base, said method comprising:

during said moving of said trolley and said portable catalyst charging hopper linearly from said fill position, energizing said rotary motor and rotating said rotary brush against the excess catalyst to brush away the excess catalyst and leave accurately measured volumes of catalyst in each of said multiple measuring compartments thereof.

14. The method of claim 7, wherein a catch receptacle is located beneath said discharge outlet of said bulk catalyst hopper and beneath said trolley support platform, said method comprising:

(a) during said moving step directing removed the excess catalyst from said portable catalyst charging hopper into said catch receptacle; and (b) periodically returning excess catalyst from said catch receptacle to said bulk catalyst hopper.

15. A method for filling a multi-compartment portable catalyst charging hopper having external walls and internal partitions defining a plurality of equal volume measuring compartments with a measured quantity of catalyst within each measuring compartment thereof containing substantially identical volumes of catalyst with a mechanized charging hopper filling system having a support base supporting a trolley platform, a bulk catalyst hopper supported by said support base and having an open top and side walls and defining a discharge outlet and having a discharge gate movable by motive means to an open position to permit discharge of catalyst from said discharge outlet into said portable charging hopper and movable by said motive means to a closed position blocking discharge of catalyst from said discharge outlet, a trolley support being supported by said support base, a trolley for supporting and moving a portable catalyst charging hopper and being linearly movable on said trolley support by a mechanized linear trolley actuator from a start position where said portable catalyst charging hopper is located for pickup by workers to a fill position where said portable catalyst charging hopper is located beneath said discharge outlet, said method comprising:

(a) with said trolley at said start position locating a portable catalyst charging hopper on said trolley and with said linear actuator moving said trolley and said portable catalyst charging hopper linearly along said trolley support platform to said fill position;

(b) opening said discharge gate for a sufficient period of time to overfill each of the measuring compartments of said portable catalyst charging hopper;

(c) closing said discharge gate;

(d) with said linear actuator moving said trolley and said portable catalyst charging hopper linearly from said fill position to said start position; and (e) during said moving of said movable trolley removing excess catalyst of the overfilled portable catalyst charging hopper with a movable wiper element positioned for controlled removal of excess catalyst to ensure accurately measured volumes of catalyst in each of said multiple measuring compartments.

* * * * *